(12) United States Patent
Episkopos et al.

(10) Patent No.: US 7,886,272 B1
(45) Date of Patent: *Feb. 8, 2011

(54) PRIORITIZE CODE FOR TESTING TO IMPROVE CODE COVERAGE OF COMPLEX SOFTWARE

(75) Inventors: Dennis C. Episkopos, Westminster, CO (US); J. Jenny Li, Basking Ridge, NJ (US); Howell S. Yee, Highlands Ranch, CO (US); David M. Weiss, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1061 days.

This patent is subject to a terminal disclaimer.

(21) Appl. No.: 11/477,020

(22) Filed: Jun. 28, 2006

Related U.S. Application Data

(60) Provisional application No. 60/776,462, filed on Mar. 16, 2006, provisional application No. 60/791,376, filed on Apr. 11, 2006.

(51) Int. Cl.
G06F 9/44 (2006.01)
G06F 9/45 (2006.01)
G06F 17/50 (2006.01)
G06G 7/62 (2006.01)

(52) U.S. Cl. ................ 717/124; 717/127; 717/131; 717/132; 717/133; 717/136; 703/13; 703/17; 703/22

(58) Field of Classification Search ................ 717/124, 717/127, 131, 132, 133, 136; 703/13, 17, 703/22

See application file for complete search history.

(56) References Cited

U.S. PATENT DOCUMENTS 6,099,575 A 8/2000 Hardin et al.

(Continued)

OTHER PUBLICATIONS

Hiralal Agrawal, "Dominators Super Blocks, and Program Coverage", 1994, ACM publishing.*

(Continued)

*Primary Examiner*—Emerson C Puente
*Assistant Examiner*—Charles Swift
(74) *Attorney, Agent, or Firm*—Sheridan Ross P.C.

(57) ABSTRACT

The present invention is directed to automatically analyzing software systems for identifying faults or bugs and/or detection of malicious code. In various embodiments, the present invention measures code coverage for high priority invocable program elements, uses a relaxed coverage estimation technique that, instead of guaranteeing which code units will be executed, guarantees that at least a certain number of code units will be executed, determines and solves constraints in code to identify infeasible paths containing one or more selected nodes, determines, for a composite data type, a range of values for each of at least two non-composite data fields, and/or translates, prior to code analysis complex code into simpler code having fewer operators.

23 Claims, 18 Drawing Sheets

U.S. PATENT DOCUMENTS

| | | | |
|---|---|---|---|
| 7,146,606 B2 * | 12/2006 | Mitchell et al. | 717/141 |
| 7,512,912 B1 | 3/2009 | Iyer | |
| 7,587,636 B2 * | 9/2009 | Tillmann et al. | 714/33 |
| 2009/0199162 A1 * | 8/2009 | Choi et al. | 717/124 |

OTHER PUBLICATIONS

Bruce Eckel, "thinking in java", 1998, Prentice Hall.*
Debray et al, "Compiler Technique for code Compaction", Mar. 2000, ACM publishing.*
Dov Harel, "A linear time algorithm for finding dominators in flow graphs and related problems", 1985, ACM publishing.*
Tikir et al, "efficient instrumentation for code coverage testing", 2002, ACM publishing.*
Gupta, "generalized dominators and post-dominators", 1992 ACM publishing.*
Kazi et al, "Techniques for obtaining high performance in Java programs", 2001 ACM publishings.*
Kone, O. and Castanet, R.; "Test Generation for Interworking Systems"; Computer Communications; Mar. 13, 2000; pp. 642-652 (Abstract Only); vol. 23, Issue 7.
Malaiya, Y., et al.; "Software Reliability Growth With Test Coverage"; IEEE Transactions on Reliability; Dec. 2002; pp. 420-427; vol. 51, No. 4.
Agrawal, H., et al.; "Mining System Tests to Aid Software Maintenance"; IEEE Computer; Jul. 1998; pp. 64-73; vol. 31, No. 7.
Trew, T.; "What Design Policies Must Testers Demand From Product Line Architects?"; International Workshop on Software Product Line Testing; pp. 51-57.
Chatterjee, R. and Ryder, B.; "Data-Flow-Based Testing of Object-Oriented Libraries"; Department of Computer Science, Rutgers University, No. DCS-TR-382; Mar. 1999.
Agrawal, H.; "Dominators, Super Blocks, and Program Coverage"; Proceedings of the 21st Symposium on Principles of Programming Languages; Jan. 1994; pp. 25-34; Portland, OR.
Jeng, B. and Weyuker, E.; "A Simplified Domain-Testing Strategy"; ACM Transactions on Software Engineering and Methodology; Jul. 1994; pp. 254-270; vol. 3, No. 3.
Zeng, Z. and Ciesielski, M., and Rouzeyre, B.; "Functional Test Generation Using Constraint Logic Programming"; Proceedings of the 11th IFIP International Conference on Very Large Scale Integration—the Global System on Chip Design & CAD Conference; Dec. 2001; pp. 375-387; Montpellier, France.
Demillo, R. and Offutt, A.; "Constraint-Based Automatic Test Data Generation"; IEEE Transactions on Software Engineering; Sep. 1991; pp. 900-910; vol. 17, No. 9.
Gu, Z., and Cheng, K.; "The Derivation of Test Cases from SDL Specifications"; Proceedings of the ACM 30th Annual Southeast Conference; Apr. 8-10, 1992; 219-227; Raleigh, NC.
King, J.; "Symbolic Execution and Program Testing"; Communications of the ACM; Jul. 1976; pp. 385-394 (Abstract Only); vol. 19, Issue 7.
Cohen, D., et al.; "The Combinatorial Design Approach to Automatic Test Generation"; IEEE Software; Sep. 1996; pp. 83-87; vol. 13, No. 5.
Cohen, D., et al.; "The AETG System: An Approach to Testing Based on Combinatorial Design"; IEEE Transactions on Software Engineering; Jul. 1997; pp. 437-444 (Abstract Only); vol. 23, No. 7.
Edvardsson, J.; "A Survey on Automatic Test Data Generation"; Proceedings of the Second Conference on Computer Science and Engineering; Oct. 1999; pp. 21-28; Linkoping, Sweden.
Hartmann, J., Imoberdorf, C., and Meisinger, M.; "UML-Based Integration Testing"; Proceedings of ACM SIGSOFT International Symposium on Software Testing & Analysis; Aug. 2000; pp. 60-70; Portland, OR.
Luo, G. Das, A.,and Bochmann, G.; "Software Based on SDL Specifications with Save"; IEEE Transactions on software Engineering; Jan. 1994; pp. 72-87 (Abstract Only); vol. 20 No. 1.
Kim, Y., et al.; "Test Cases Generation from UML State Diagrams"; IEE Proceedings—Software; Aug. 1999; pp. 187-192; vol. 146, No. 4.
Korel, B.; "Automated Software Test Data Generation"; IEEE Transactions on Software Engineering; Aug. 1990; pp. 870-879 (Abstract Only); vol. 16, No. 8.
Kovacs, G., Pap, Z., and Csopaki, G.; "Automatic Test Selection Based on CEFSM Specifications"; Acta Cybernetica; Dec. 2002; pp. 583-599 (Abstract Only); vol. 15, Issue 4.
Li, J., and Wong, W.; "Automatic Test Generation from Communicating Extended Finite State Machine (CEFSM)-Based Models"; Proceedings of the Fifth IEEE International Symposium on Object-Oriented Real-Time Distributed Computing (ISORC); Apr.-May 2002; pp. 181-185 (Abstract Only); Washington, DC.
Scheetz, M., et al.; "Generating Goal-Oriented Test Cases"; Proceedings of the 23rd Annual International Computer Software and Applications Conference; Oct. 1999; pp. 110-115; Phoenix, AZ.
Michael, C. and McGraw, G.; "Automated Software Test Data Generation for Complex Programs"; Proceedings of the 13th IEEE International Conference on Automated Software Engineering; Oct. 1998; pp. 136-146, Honolulu, HI.
Michael, C., et al.; "Genetic Algorithms for Dynamic Test Data Generation"; Proceedings of the 12th IEEE International Conference on Automated Software Engineering; Nov. 1997; pp. 307-308; Incline Village, NV.
Offutt, J. and Abdurazik, A.; "Generating Tests from UML Specifications"; Proceedings of the Second International Conference on the Unified Modeling Language; Oct. 1999; pp. 416-429; Fort Collins, CO.
Tran Sy, N. and Deville, Y.; "Automatic Test Generation for Programs with Integer and Float Variables"; Proceedings of the 16th IEEE International Conference on Automated Software Engineering; Nov. 2001; p. 13 (Abstract Only); San Diego, CA.
Tran Sy, N. and Deville, Y.; "Consistency Techniques for Interprocedural Test Data Generation"; Proceedings of the Ninth European Software Engineering Conference and ACM SIGSOFT Symposium on the Foundations of Software Engineering; Sep. 2003; pp. 108-117; Helsinki, Finland.
Tsai, W., et al.; "Adaptive Scenario-Based Testing Using UML"; Object Management Group's Third Workshop on UML for Enterprise Applications; Oct. 2002; San Francisco, CA.
Henniger, O. and Ural, H.; "Test Generation Based on Control and Data Dependencies Within Multi-Process SDL Specifications"; Computer Communications; Mar. 2000; pp. 609-627; vol. 23, Issue 7.
Wong, W., Lei, Y., and Ma, X.; "Effective Generation of Test Sequences for Structural Testing of Concurrent Programs"; Proceedings of the Tenth IEEE International Conference on Engineering of Complex Computer Systems; Jun. 2005; pp. 539-548 (Abstract Only); Shanghai, China.
Wong, W.; "Coverage Testing Software Architectural Design in SDL"; Computer Networks: The International Journal of Computer and Telecommunications Networking; Jun. 2003; pp. 359-374 (Abstract Only); vol. 42, Issue 3.
xSuds User's Manual, First Edition; Telcordia Technologies, Inc.; Jul. 1998; Cover Page and Table of Contents Only. Entire document available on-line at http://xsuds.argreenhouse.com/html-man/.
"Integer Security, Lnear the root causes of software vulnerablilites and how to avoid it", http://www.codeguru.com/cpp/sample_chapter/articie.php/c11111/, Dec. 15, 2005.
"Cunit A Unit Testing Framework for C", available at http://cunit.sourceforge.net, version from Jun. 18, 2006, 1 page.
"JUnit", available at http://junit.sourceforge.net/, version from Jun. 15, 2006, 2 page.
"JUnit, Testing Resources for Extreme Programming", available at www.junit.org, version from Jun. 15, 2006, 1 page.
Clarke, "A system to generate test data and symbolically execute programs," IEEE Transactions Software Engineering, 2(3):215-222, Sep. 1976. (Abstract only).
Gu et al., "The Derivation of Test Cases from SDL Specifications," ACM 30th Annual Southeast Conference, 1992, pp. 219-227.
U.S. Appl. No. 11/477,043, filed Jun. 28, 2006.
U.S. Appl. No. 11/477,019, filed Jun. 28, 2006.
Harris, K., "cpp_random_number.cpp," available at http://www.codesampler.com/miscsrc.htm, section random number generator, Sep. 25, 2004, 4 pages.
Bromstrup et al., "TESDL: Experience with Generating Test Cases from SDL Specifications," SDL '89 The language at Work: Proceedings of the Fourth SDL Forum, 1989, pp. 267-279, Elsevier Science Publication Co.

* cited by examiner

```
count(file, p_nl, p_nw, p_nc) FILE *file;
int *p_nl, *p_nw, *p_nc; {
1     int c, nl, nw, nc, state;
2     state = OUT;
3     nl = 0;
4     nw = 0;
5     nc = 0;
6     while (EOF != (c = getc(file))) {
7         ++nc;
8         if (c == '\n')
9             ++nl;
10        if (c == ' ' || c == '\n' || c == '\t')
11            state = OUT;
12        else if (state == OUT) {
13            state = IN;
14            ++nw;
15        }
16    }
17    *p_nl = nl;
18 *p_nw = nw;
19    *p_nc = nc; }
```
Fig. 1 (Example C code)
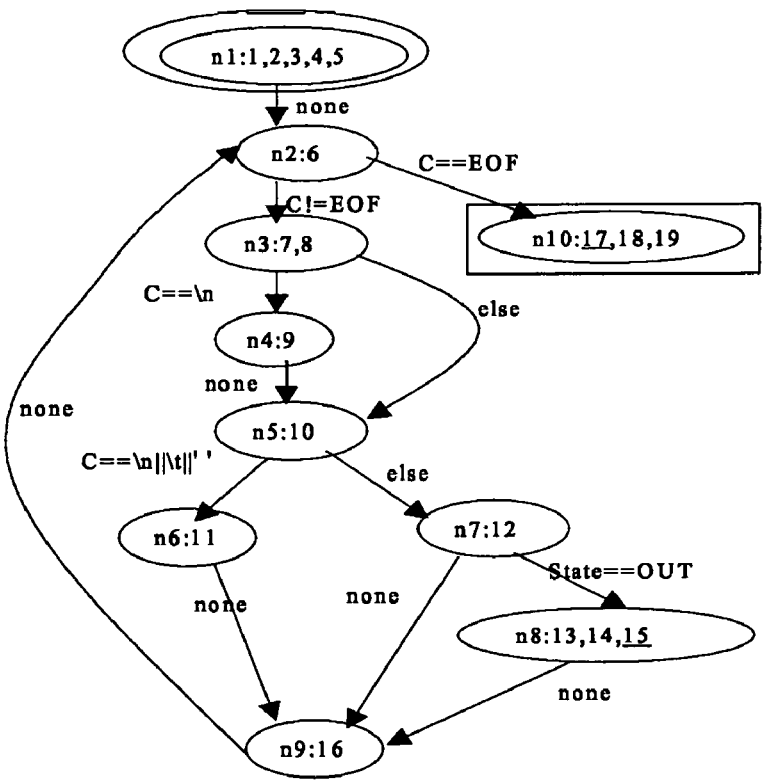
Fig. 2 (Example prior art control flow graph)

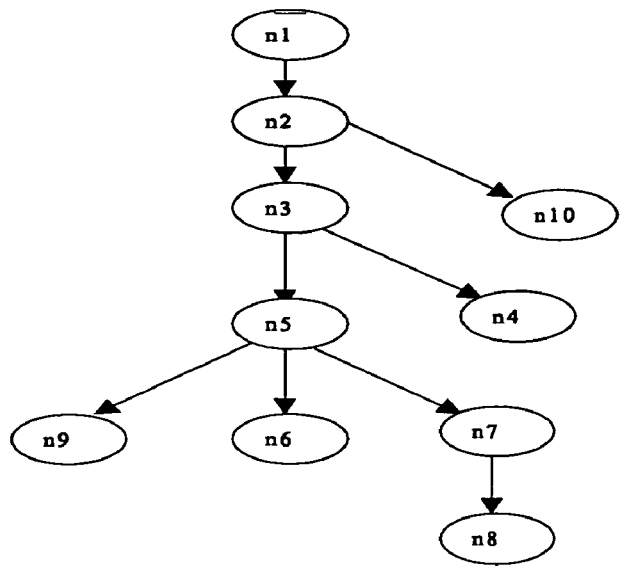
Fig. 3 (Example prior art pre-dominator graph)
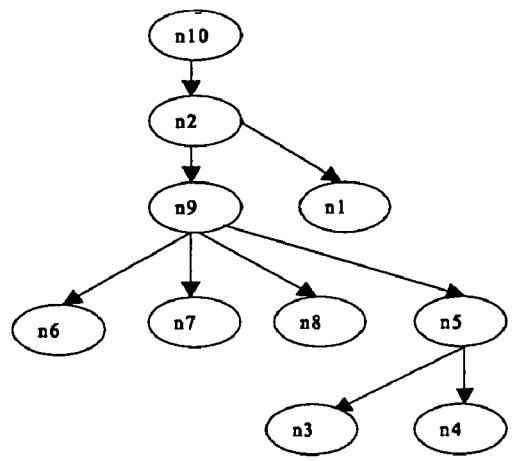
Fig. 4 (Example prior art post-dominator graph)

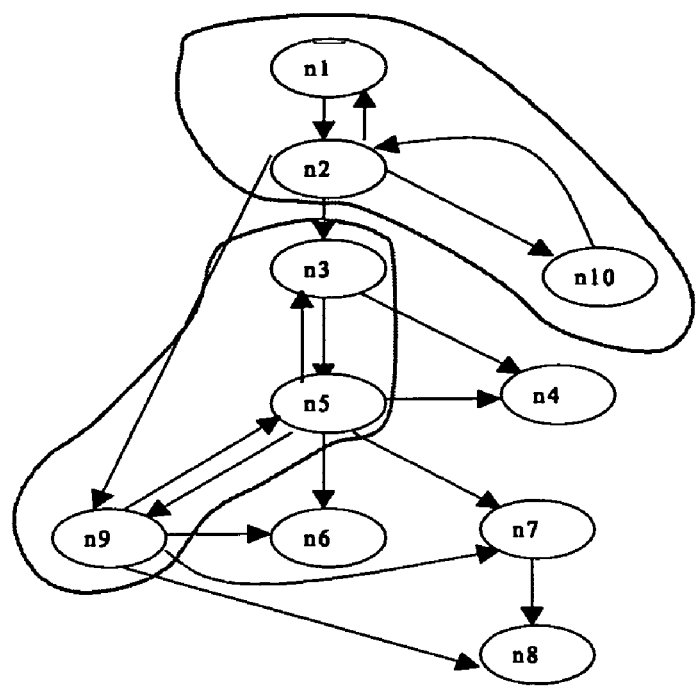
Fig. 5 (Example prior art combination graph)
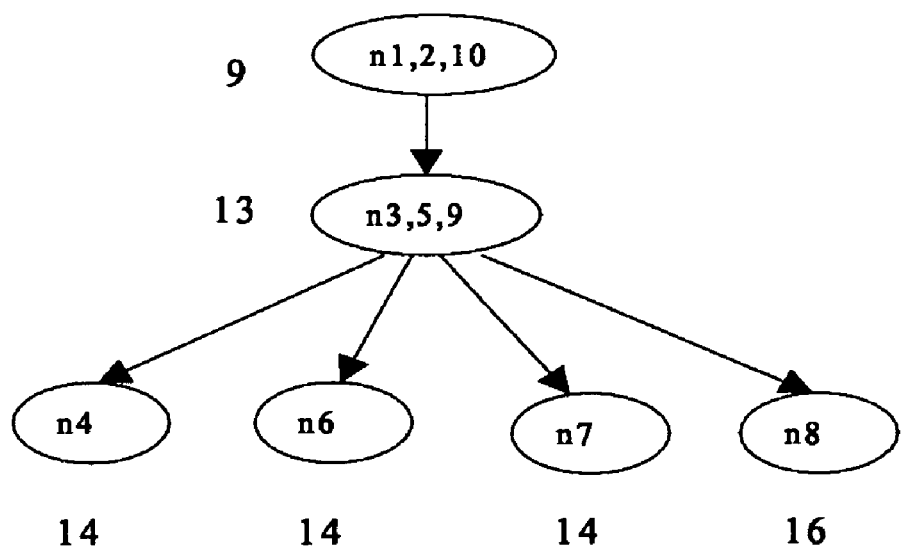
Fig. 6 (Example prior art super block dominator graph)

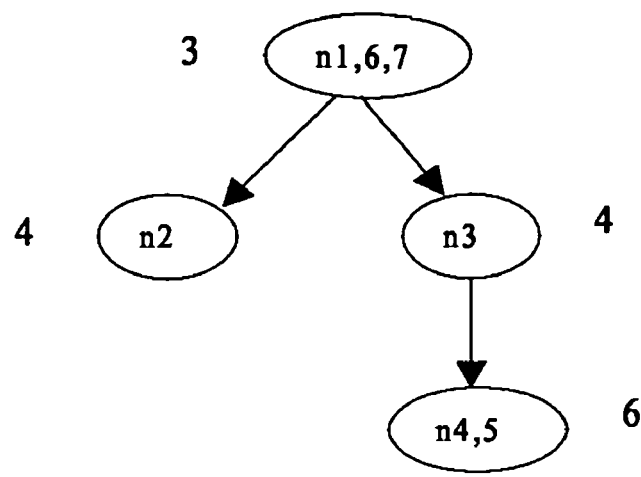
Fig. 7(a) (Super block dominator graph of method m1)
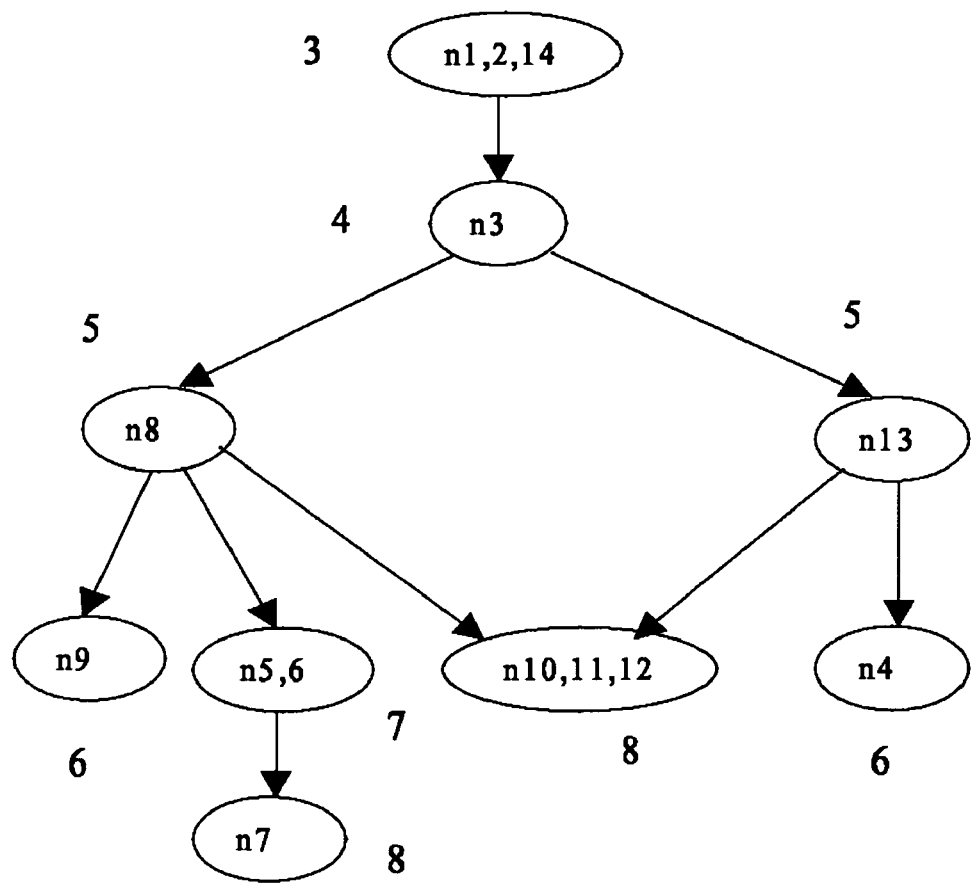
Fig. 7 (b) Super block dominator graph of method m2

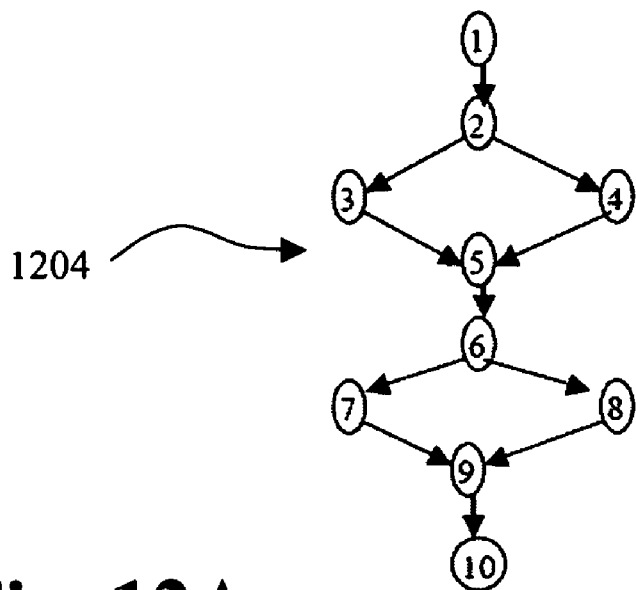
Fig. 12A A control flow diagram example
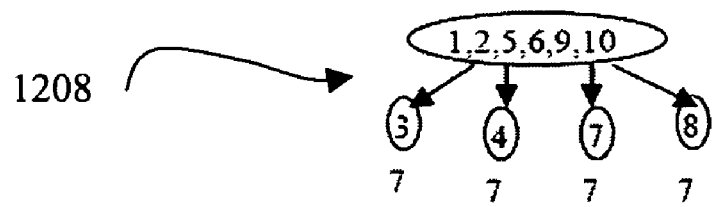
Fig. 12B Super block diagram
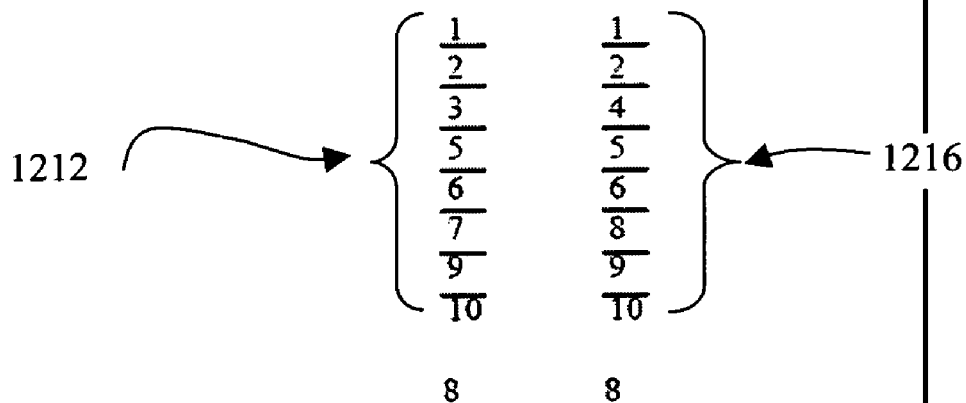
Fig. 12C

```
public void myCSP1(boolean x1, boolean x2, boolean
x3, boolean x4, boolean x5, boolean x6, boolean x7,
boolean x8, boolean x9) {
    if ((x1 || x2 || x3) &&
        (x4 || x5 || x6) &&
        (x7 || x8 || x9))
        System.out.println("Hello CSP1");
}
```

Fig. 15

```
void myCSP1(ZZZZZZZZZ)V
0:   iload_1
1:   ifne          #12
4:   iload_2
5:   ifne          #12
8:   iload_3
9:   ifeq          #50
12:  iload              %4
14:  ifne          #27
17:  iload              %5
19:  ifne          #27
22:  iload              %6
24:  ifeq          #50
27:  iload              %7
29:  ifne          #42
32:  iload              %8
34:  ifne          #42
37:  iload              %9
39:  ifeq          #50
42:  getstatic          java.lang.System.out
Ljava/io/PrintStream; (2)
45:  ldc           "Hello CSP" (50)
47:  invokevirtual      java.io.PrintStream.println
(Ljava/lang/String;)V (4)
50:  return
```

Fig. 16

```
public void myexample2 (String msg1, String msg2) {
        id = ((Integer)hashmap.get(msg1)).intValue();
    if(id > 0) {
        if (msg1.equals(msg2)) {
            System.out.println("The lengths are equal. ");
            test2Print(msg1);
        } else {
            System.out.println("The lengths not equal");
            if (msg1.length() > msg2.length()) {
                System.out.println("msg1 is longer");
                samplePrint(msg1);
            } else {
                System.out.println("msg2 is longer");
                samplePrint(msg2);
            }
        }
    } else
       System.out.println("wrong id");
}
```

Fig. 19

```
void mymethod2(Ljava/lang/String;Ljava/lang/String;)V
0:   aload_0
1:   aload_0
2:   getfield     Sample.hashmap Ljava/util/HashMap; (11)
5:   aload_1
6:   invokevirtual java.util.HashMap.get
         (Ljava/lang/Object;)Ljava/lang/Object; (48)
9:   checkcast    <java.lang.Integer> (49)
12:  invokevirtual java.lang.Integer.intValue ()I (50)
15:  putfield     Sample.id I (9)
18:  aload_0
19:  getfield     Sample.id I (9)
22:  ifle         #97
25:  aload_1
26:  aload_2
27:  invokevirtual java.lang.String.equals (Ljava/lang/Object;)Z (36)
30:  ifeq         #48
33:  getstatic    java.lang.System.out Ljava/io/PrintStream; (2)
36:  ldc          "The lengths are equal. " (51)
38:  invokevirtual java.io.PrintStream.println (Ljava/lang/String;)V (4)
41:  aload_1
42:  invokestatic Sample.test2Print (Ljava/lang/String;)V (43)
45:  goto         #105
48:  getstatic    java.lang.System.out Ljava/io/PrintStream; (2)
51:  ldc          "The lengths now equal" (52)
53:  invokevirtual java.io.PrintStream.println (Ljava/lang/String;)V (4)
56:  aload_1
57:  invokevirtual java.lang.String.length ()I (35)
60:  aload_2
61:  invokevirtual java.lang.String.length ()I (35)
64:  if_icmple    #82
67:  getstatic    java.lang.System.out Ljava/io/PrintStream; (2)
70:  ldc          "msg1 is longer" (53)
72:  invokevirtual java.io.PrintStream.println (Ljava/lang/String;)V (4)
75:  aload_1
76:  invokestatic Sample.samplePrint (Ljava/lang/String;)V (46)
79:  goto         #105
82:  getstatic    java.lang.System.out Ljava/io/PrintStream; (2)
85:  ldc          "msg2 is longer" (54)
87:  invokevirtual java.io.PrintStream.println (Ljava/lang/String;)V (4)
90:  aload_2
91:  invokestatic Sample.samplePrint (Ljava/lang/String;)V (46)
94:  goto         #105
97:  getstatic    java.lang.System.out Ljava/io/PrintStream; (2)
100: ldc          "False ID" (47)
102: invokevirtual java.io.PrintStream.println (Ljava/lang/String;)V (4)
105: return
```

Fig. 20

PRIORITIZE CODE FOR TESTING TO IMPROVE CODE COVERAGE OF COMPLEX SOFTWARE

CROSS REFERENCE TO RELATED APPLICATION

The present application claims the benefits of U.S. Provisional Application Ser. Nos. 60/776,462, filed Mar. 16, 2006, and 60/791,376, filed Apr. 11, 2006, both of the same title and each of which are incorporated herein by this reference.

FIELD OF THE INVENTION

The invention relates generally to testing software code and particularly to code prioritization for testing.

BACKGROUND OF THE INVENTION

Software testing accounts for 50% of software development efforts throughout the history of software engineering. Coverage-based testing is one way to improve testing efficiency. Software reliability grows with the increment of test coverage. Test coverage provides a way to quantify the degree of thoroughness of testing.

Code coverage is measured after the tests are executed. Most research in the area of code-coverage based testing focuses on defining meaningful criteria and measuring coverage after tests.

Not much research has been done on improving testing before test cases are constructed. One area of such research is software design for testability. This work attempts to give guidelines on how to design software that will be easy to test and hopefully reducing the cost of testing.

The other area of pre-testing effort is code prioritization for testing. This research area attempts to analyze the programs and prioritize the code to guide the test construction to achieve maximal coverage effect based on various criteria. The question of which lines of the code should be tested first is often raised before test construction. Many criteria can be used to prioritize code for testing, such as change frequency, complexity metrics and potential code coverage. There are two kinds of code coverage of analysis that may be used in code prioritization, i.e., a control flow based analysis and a data flow based analysis. The control-flow based analysis uses criteria such as source line coverage, basic block coverage and decision coverage (these terms are described in the Terms and Description section hereinabove). The data flow based analysis uses criteria such as p-use and c-use, as one skilled in the art will understand.

One traditional method of code prioritization uses what is known in the art as a dominator analysis to determine code priorities, wherein the higher priority for a portion (P) of code, the greater the amount of code that is covered by test cases that are designed to execute the code for P. Thus, the dominator analysis provides a technique for efficiently testing the code of a software system in that test cases for high priority portions of code designed and input to the software system first. Dominator analysis was invented originally for C programs, in which each procedure can be quite large. However, dominator analysis is limited when applied to object-oriented programs. For example, one limitation with dominator analysis is that it considers only the node relationship within an object-oriented class method. That is, it does not consider dependencies among object-oriented classes and methods. Additionally, the calculations performed in a dominator analysis can consume large computational resources, both in computation time and data storage.

Unit testing has become an important step in software development. It is used in both extreme programming and conventional programming. It promises to move the costly testing and defect removal activities to earlier stages of software development, thus reducing such costs since it is well known that the earlier in development such defects are identified, the more cost effective the development effort. Writing unit tests is an essential part of the internal deliverables. However, unit test code is often not part of the deliverable code that gets delivered to the customer. Sometimes it is difficult to justify spending as much time in writing tests as writing code for a customer. Therefore, it is important to reduce the effort of unit testing by using automation, so that unit testing can be more widely adapted by developers.

Many parts of unit testing have been automated. For example, since unit tests are often represented in the source code's language, they can be compiled with the source and executed automatically. Generation of unit testing frameworks has also been automated, e.g., Junit www.junit.org JUnit is a regression testing framework written by Erich Gamma and Kent Beck. It is used by a developer who implements unit tests in Java. JUnit is Open Source Software, released under the Common Public License Version 1.0 and hosted on SourceForge. Another automated testing framework is Cunit written by Anil Kumar and Jerry St. Clair, documentation available at http://cunit.sourceforge.net. However, the generated tests obtained from such frameworks are represented in mocks or stubs, where users still need to fill in detailed algorithms in order that fully functioning test cases can be executed. Furthermore, none of the prior art generation methods emphasize generating efficient test data to increase the code coverage in an effective way. However, coverage-based testing tools do not consider automatic test generation. Even though some, such as xSuds provide hints on which part of the code should be tested first, they fail to generate the test sequence, and fail to generate actual test cases.

Much research on automatic test generation is based on specifications/models other than source code. For example, studies have applied control flow and data flow-based test selection criteria to system specifications in SDL for generating tests. Similar research has also been conducted on how to generate tests from UML models, FSM/EFSM/CEFSM-based models, and combinatorial designs, as one skilled in the art will understand. While a model-based method may be suitable for system level testing, it is not practical for unit testing because of the high cost in writing an additional model for each source unit.

Using various coverage criteria, dominator analysis prioritizes programs for increasing code coverage. A program block A dominates a block B if covering A implies covering B, that is, a test execution cannot reach block A without going through block B or it cannot reach block B without going through block A. This method is applicable to both data flow and control flow analysis. Without losing generality, we will use control-flow as examples throughout the present disclosure.

The dominator analysis starts from construction of a control-flow diagram from each function or method. Traditional dominator analysis for coverage-based code prioritization considers only control flow structural factors inside a function/method.

To explain how the traditional dominator analysis works, consider a C program that includes only basic source lines without any function calls. A control flow graph (alternatively, data flow graph) corresponding to the C program is then generated and the dominator analysis uses the control flow graph (alternatively, data flow graph) to identify the importance of various portion(s) (e.g., a line of codes) of the C program such that when these portions of the program are executed, e.g., via a particular test case, a greater number of, e.g., other program code lines must also be executed.

One such illustrative C program (wordcount.c) is given in FIG. 1. This program includes one function definition and the function does not call any other functions. The goal of testing coverage in this situation is to cover (i.e., execute) as many basic blocks (or decisions or other important code characteristics) within this function as possible with the least number of test cases.

Dominator analysis method first constructs the corresponding control flow diagram (FIG. 2), wherein each node of the control flow graph corresponds to one basic block, which is defined in the Terms and Description section hereinbelow. The control flow graph of FIG. 2 includes a total of 10 basic blocks, each of which is represented in one oval-shaped node. A double oval-shaped node (e.g., node n1) represents the starting point of the program and the oval within a square box around it denotes the exiting node (e.g., node n10). Each program usually has one starting node and could have multiple exiting nodes.

Dominator analysis approach for basic block priority calculation includes five steps: 1) generation of a pre-dominator tree, 2) generation of a post-dominator tree, 3) combining the two trees, 4) identification of the strongly connected components to form a super-block dominator tree, and 5) perform a priority calculation using the super-block dominator tree.

An example of how to obtain code priorities using the five steps will be discussed with reference to FIGS. 1 and 2.

1) Generate the Pre-Dominator Graph.

Using the algorithms given in (e.g., the reference Ref. 9 identified in the References section hereinbelow), the corresponding pre-dominator tree of the control flow graph in FIG. 2 can be generated as given in FIG. 3. A node x predominates a node y, if every path from the entry node to the node x includes node y. In the pre-dominator tree, node x is a child of node y. In FIG. 3, n9 predominates n5, n3, n2 and n1. It means that all paths going from the starting node through to n9 also go through node n1, n2, n3, and n5.

2) Generate a Post-Dominator Graph.

The post-dominator relationship is the same as the pre-dominator relationship in the reversed control flow graph. A node x post-dominates a node y, if every path from node x to all exiting nodes includes node y. The node x is the child of node y in the post-dominator tree. The post-dominator tree of FIG. 2 control flow graph is given in FIG. 4.

3) Combine Pre- and Post-Dominator Graphs

The combination of FIG. 3 and FIG. 4 generates a graph as given in FIG. 5.

4) Identify and group strongly connected components Strongly connected components are the groups of nodes having numbers that dominate all the member nodes in that group. After grouping strongly connected nodes and removing redundant edges, the super block dominator graph is given in FIG. 6.

5) Assign coverage priority to each node of the original control flow graph Based on the FIG. 6 super-block dominator graph, the priority of each original node can be calculated. First assign a weight to each original node, which is defined as the number of source lines included in that node. For example, the weight of node n1 is 5 because it includes 5 source lines. Second, using a top-down traversal approach to go through the super block dominator graph, assign a priority to each super block node, wherein the priority is the summation of the individual nodes inside each strongly connected group (super block) plus the priority of the parent super block. For example, the super block (strongly connected group) "n1,2,10" has a priority value of 9, which is the summation of the weights of nodes "n1" (5), "n2" (2) and "n10" (2) of the control flow graph of FIG. 2 (note that since the super block node "n1,2,10" does not have a parent node no additional priority value from another super block node is added). However, for the super block "n3,5,9", it has a priority value of 13, which is the sum of this node's parent node priority of 9, plus each of the node weights for the nodes n3, n5, and n9 (i.e., 2+1+1).

In summary, we obtain priorities or weights for each node of the original control flow graph. For nodes 1, 2 and 10 of the original control flow graph, each have a priority of 9 because covering any of them will guarantee to cover 9 lines of code on the three nodes. Nodes n3, n5, and n9 each have a priority of 13. Nodes n4, n6 and n7 each has a priority of 14. Node n8 has the highest priority of 16 (i.e., 13 from node "n3,5,9" of FIG. 6, and 3 from "n8:13,14,15" of FIG. 2). The complexity of the dominator analysis method is O (N+E) when N is the number of nodes (in the original control flow graph) and E is the number of edges (in the original control flow graph).

The original dominator analysis method does not include impact of global coverage. Consider a practical scenario as follows. Suppose we are given a piece of large complex software to test and the software includes 10 packages, each of which has an average of say 200 classes and each class has an average of say 50 methods. The question is which package, which class and which method should be tested first to achieve the highest coverage, i.e., which part of the code has the highest priority. To answer this question, we need to consider global coverage impact of dominators, which is not provided in the conventional dominator analysis method.

Note that the dependency relationships among "invocable program elements" (e.g., packages, classes and methods) without control flow graph analysis cannot guarantee execution relationships among such invocable program elements. For example, the dependency of a method x calling a method y cannot guarantee that y will be covered whenever x is covered. Moreover, dependency diagrams such as one or more call graphs do not give dominator information among classes and methods.

Accordingly, it is desirable for such higher-level dependency relationships to be added into the prior art control flow graph analysis methods.

TERMS AND DESCRIPTIONS

In the descriptions for the list of terms in this section, italics indicate a term that is also a term on the list.

Code unit: A unit of program code that is a series of contiguous program tokens, wherein the series is terminated by symbols from a predetermined set of one or more symbols. A code unit may be a line of executable code, wherein the predetermined set of symbols includes a symbol identifying the end of a line. However, a code unit may correspond to other portions of program code. For instance, a series of tokens between consecutive program statement delimiters may be considered as code units. Thus, in a program language such as C, PASCAL, C++ and others, a statement terminating symbol such as ";" is a delimiter between program language statements, and each such statement may be considered as a code unit. Additionally, a code unit may correspond to a plurality (e.g., a contiguous sequence) of code lines and/or programmatic statements having predetermined executable entry points and predetermined executable exit points. For example, in one embodiment, a plurality of program statements defining an invocable function, routine or other invocable program element (as this term is described herein) may be considered a code unit.

Code coverage (equivalently, "coverage" herein): When referring to a software verification technique, this term denotes an analysis method that determines which parts of the software have been executed (covered) by a test case suite and which parts have not been executed and therefore may require additional attention. Code coverage is distinct from black box testing methods because it looks at the code directly, rather than other measures such as software functions or object interfaces. When referring to a resulting measurement, in such an analysis method the measurement indicates the adequacy of test cases in terms of the extent to which software elements (e.g., statements, decisions, branches, paths, etc.) are executed during testing.

Covered: A code unit is covered if it is executed by at least one test case.

Dominates: A programmatic element A (e.g., a code unit such as a program statement, a block of program statements, or a routine, etc.) dominates (or is a covering for) a programmatic element B if and only if an execution of B requires an execution of A. For example, a test execution cannot reach programmatic element A without going through block B or vice versa.

Statement-block: A contiguous sequence of one or more code units, wherein an execution of any one of the code units implies that each of the code units is executed.

Basic block: A maximal contiguous sequence of lines of code, wherein if any one of the code lines is executed, then every one of the lines of code is executed.

Invocation-block: A basic block in which at least one statement inside a block invokes a function call, a method call, program call, or other invocable program element.

Source line coverage: The percentage of the number of lines of code that have been tested relative to the total number of lines of code to be tested.

Basic block coverage: The percentage of the number of basic blocks of a control flow graph that have been tested relative to the total number of basic blocks to be tested.

Decision coverage: The percentage of the number of condition branches that have been tested relative to the total number of condition branches to be tested.

Invocable program element: A collection of one or more code units, wherein the execution thereof must proceed from a predetermined entry code unit to at least one predetermined exit code unit, and wherein a further code unit identifying an execution of the collection is distinct from the collection. Accordingly an invocable program element may be software package, a collection of one or more class hierarchies, class methods, functions, subprograms, macros, and/or other executable structures that, e.g., can be "invoked" from a plurality of different locations within the code of a software system.

SUMMARY OF THE INVENTION

These and other needs are addressed by the various embodiments and configurations of the present invention. The present invention is generally related to the analysis of the program code to be tested to facilitate generation of test cases so as to prioritize, in the test paradigm, and highlight selected parts of the software or program code. The invention, thus provides an automatic software analysis system that analyzes software code and identifies faults, bugs, and malicious code.

In a first embodiment, a method is provided for determining a series (S) of one or more code units within program code. The method includes the steps of:

(a) determining a plurality of series of code units, such that, if any one of the code units of the series is executed, then each code unit of the series is executed;

(b) identifying one or more series ($S_0$), wherein $S_0$ includes an invocable program block that includes a set of one or more invocable program elements;

(c) determining a grouping of one or more code units for each of the invocable program elements in the set, the grouping including some or all of the code units for an execution path from a starting code unit for the respective invocable program element to an ending code unit for the respective invocable program element;

(d) determining a value for the invocable program block and/or each of the invocation program blocks in the set; and (e) determining (or selecting) the series S as one of a number of series, with the elements of S being related to the value.

In one configuration, a priority is obtained for each of the plurality of series. The priority for $S_0$ is dependent upon the value for a member of the set. S is determined or selected from the priorities.

This method and system determines program code coverage by taking into account a "global view" of the execution of a software system being tested. It uses, as a measurement of "code coverage", invocable program elements (e.g., functions) to determine a high priority code unit (e.g., a code line) that, when executed by a test case, implies that a large number other code units are also executed.

In a second embodiment, a method for determining a series (S) of one or more code units within software code is provided that includes the steps of:

(a) obtaining a representation of a graph, the graph corresponding to a flow graph for the software code and each node of the graph to a series of code units of the software code, such that, if any one of the code units of the series is executed, then each code unit of the series is executed;

(b) determining one or more acyclic executable paths through the graph from a predetermined starting node of the graph to a predetermined ending node of the graph;

(c) determining, for selected nodes of the graph, a corresponding weight;

(d) determining, for each of the acyclic executable paths, a corresponding path weight, with each executable path (P) having a path weight (Wtp), the path weight Wtp being related to a combination of the weights of selected nodes of the executable path P;

(e) determining, for each node (N) of the graph, a corresponding priority using the path weight for each of the executable paths containing N; and (f) determining the series S of code units from the corresponding priorities of the nodes.

This method and system for determining program code coverage can be much faster and use less storage than the code coverage estimation processes used in the prior art. In particular, the method and system is a "relaxation" of the prior art code coverage estimation technique in that, instead of guaranteeing which code units will be executed, the system and method can ensure that at least a certain number of code units will be executed. In particular, the relaxation estimation generally does not guarantee which code units will be executed (when a test case is generated that forces a particular code unit to be executed), but instead generally guarantees that at least a certain number of code units will be executed.

In a third embodiment, a method for generating test cases for testing software code is provided that includes the steps of:

(a) identifying a path through the software code;

(b) determining constraints in a set of code units that, if satisfied, cause the path to be executed;

(c) solving the constraints for determining input data to the software code; and (d) determining a corresponding data set satisfying the constraints; and (e) generating, from the data set, test code for executing the software code in a manner that causes execution of the software code to perform the set of code units.

In a fourth embodiment, a method is provided for generating test cases for testing software code. The method includes the steps of:

(a) determining constraints in a set of selected code units that, if satisfied, cause the software code to be executed;

(b) determining, for at least one composite data type having an instantiation accessed by the constraints, a range of values for each of at least two non-composite data fields of the instantiation;

(c) solving the constraints to determine input data to the software code, the range for at least one of the non-composite data fields being used for solving the constraints; and (d) generating test data for providing the input data to the software code.

In one configuration the embodiment decomposes a composite data type, such as a complex object into its basic data types such as integer, real, character and bit fields, and then determines an appropriate range for each of these fields. Subsequently, such ranges are used to generate appropriate test data for testing the program code.

In a fifth embodiment, a method for generating test data for testing software code includes the steps of:

(a) translating (e.g., compiling) first software code into corresponding second software code having a reduced number data operator types compared to the first software code;

(b) thereafter determining constraints in a set of selected code units of the second software code that, if satisfied, cause the second software code to be executed;

(c) solving the constraints for determining input data to the software code;

(d) determining a corresponding data set satisfying the constraints; and (e) generating, from the data set, test code for executing the software code in a manner that causes execution of the software code to perform the set of code units.

By performing code translation before code analysis, the number of operators can be reduced. By way of example, translating program code from a high level language, such as C++, to a low level language, such as object code (or a standardized variant thereof, e.g., bytecode), can make the step of determining constraints much less processing and memory resource intensive; that is, the complexity of each constraint can be substantially reduced.

The present invention can provide a number of advantages depending on the particular configuration. In addition to the advantages noted above, the present invention can provide an effective test generation architecture, or computational paradigm, for test generation. It can overcome restrictions in prior art systems in the data types that can be handled, in handling program calls when determining test cases that assure the execution of a large number of lines of code spread across, e.g., multiple function and/or object-oriented method invocations, and due to both the computational complexity and data storage space necessary for computing more optimal test cases for large software systems. The present invention can automatically generate a relatively small number of test cases that are designed to execute a very high percentage of the paths through a large software system.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 1 is an illustrative prior art example of a C program used for illustrating various computational techniques related to software code analysis.

FIG. 2 is a prior art control flow graph corresponding to the C program of FIG. 1.

FIG. 3 is a prior art pre-dominator graph derived from the control flow graph of FIG. 2.

FIG. 4 is a prior art post-dominator graph derived from the control flow graph of FIG. 2.

FIG. 5 is a prior art graph combining the post-dominator graph of FIG. 3 with the post-dominator graph of FIG. 4.

FIG. 6 is a corresponding prior art super block dominator graph corresponding to the control flow graph of FIG. 2. Additionally, note that this figure is also the super block dominator graph for the function "new_count" disclosed in the Detailed Description section hereinbelow.

FIG. 7(a) is a representation of a super block dominator graph for the method m1 identified in the program code for the function "new_count" disclosed in the Detailed Description section hereinbelow.

FIG. 7(b) is a representation of a super block dominator graph for the method m2 identified in the program code for the function "new_count" disclosed in the Detailed Description section hereinbelow.

In FIG. 11, each box with an integer therein identifies a corresponding node of FIG. 2.

FIGS. 12A through 12C show illustrative examples comparing the prior art dominator analysis method (FIG. 12B) with the relaxed priority estimation method disclosed herein. In particular, a typical control flow graph 1204 is given in FIG. 12A (for program code not shown). The corresponding super block graph 1208 generated by the traditional dominator analysis (for the graph of FIG. 12A) is shown in FIG. 12B. FIG. 12C shows a representation of acyclic paths obtained from graph 1204 (FIG. 12(A)).

FIG. 15 shows an example of a simple Java program.

FIG. 16 shows the corresponding bytecode translation of the Java program of FIG. 15.

FIG. 19 shows Java code illustrative of more complex software code for which corresponding coverage priorities, and test cases can generated according to the novel automatic software code testing system disclosed herein.

FIG. 20 shows the bytecode translation of the Java code shown in FIG. 19.

DETAILED DESCRIPTION

Code Coverage Priority Determination Using Invocable Program Elements

In a first aspect of the present disclosure, a description of how a code coverage priority determining method (such as the prior art dominator analysis method) can be augmented with priority information obtained from invocable program elements (e.g., subprograms, and object-oriented methods) so that resulting code coverage priorities are more accurately determined. In particular, such augmentation has provided a method referred to herein as the "global priority estimation method". An example is first provided to illustrate how global priority estimation method can be incorporated into a code coverage priority determining method. Consider a C++ class that has three methods, i.e., a method (identified as "new_count" whose code is provided below), a method m1, and a method m2, wherein the method "new_count" calls methods m1 (in line 12 below) and m2 (in line 17 line below), and the method m2 calls m1. Thus, "new_count" is as follows:

```
new_count(file, p_nl, p_nw, p_nc) FILE *file;
int *p_nl, *p_nw, *p_nc; {
1 int c, nl, nw, nc, state;
2 state=OUT;
3 nl=0;
4 nw=0;
5 nc=0;
6 while (EOF !=(c=getc(file))) {
7 ++nc;
8 if (c=='\n')
9 ++nl;
10 if (c==' '||c=='\n'||c=='\t')
11 state=OUT;
12 else if (m1(state)) {
13 state=IN;
14 ++nw;
15 }
16 }
17 m2(p_nl,nl);
18 *p_nw=nw;
19 *p_nc=nc;}
```

Note that new_count is similar to the function "count" of FIG. 1 described hereinabove, and the method "new_count" has the same control flow diagram as given in FIG. 2. Additionally, assume that FIGS. 7(a) and 7(b) give the super block dominator graphs of methods m1 and method m2 respectively.

For each control flow graph (e.g., FIG. 2, and those for m1 and m2, not shown) or alternatively for each data flow graph, define an invocation-block as a basic block having at least one statement (S) inside the basic block, wherein S invokes an invocable program element (e.g., function or method call). Thus, any invocation-block is also a basic-block, but a basic-block is not necessarily an invocation-block Thus, note that since "new_count" has the same super block dominator graph (FIG. 6) as "count", node "n7" of the super block dominator graph for "new_count" corresponds to the statement "else if (m1(state)) {" of line 12. Additionally, the node "n1,2,10" of the super block dominator graph (FIG. 6) identifies the statement "m2(p_nl ,nl);" of line 17 of "new_count". Accordingly, both of these nodes of "new_count" include an invocation-block.

Additionally, assume that the method m1 is invoked by the node 14 of a control flow graph for m2 (the control flow graph of m2 is not shown; however, node 14 is identified in FIG. 7(b) as included in the first node of m2's super block dominator, that is, node n1,2,14).

Figure 8:
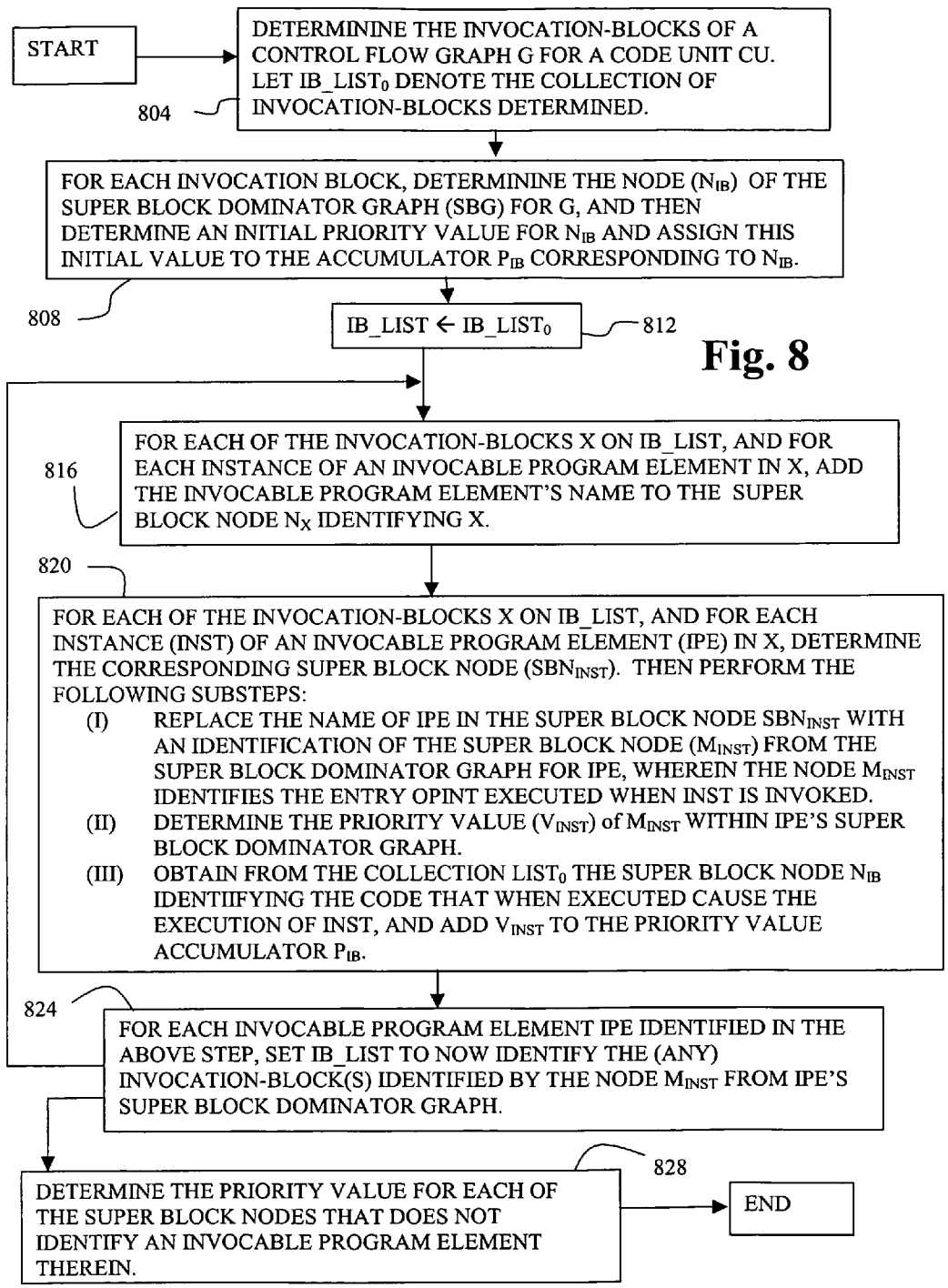
FIG. 8 shows a flowchart of the steps performed for determining coverage priority values for each for super block of a super block dominator graph for a code unit (e.g., a software system, a software program, a software method or function), wherein priority values for invocation-blocks (see Terms and Descriptions section) are determined and used in computing priority values for their corresponding super blocks.

For illustrating how the global priority estimation method may be incorporated into a dominator analysis method, the control flow graph for a code unit (CU) such as a program, method or statement block is determined. For example the control flow graph (FIG. 2) for the code unit method "new_count" is determined. Note that since node 8 (i.e., "n8:13,14, 15") of FIG. 2, and node 10 (i.e., "n10:17,18,19") of FIG. 2 now identify invocation blocks, it is desirable for the priority of their corresponding super block nodes in the super block dominator graph (FIG. 6) to account for the coverage impact of calls to the methods m1 and m2. Accordingly, using the dominator analysis described in the Background section hereinabove, a super block dominator graph (SBG) corresponding to the code unit CU is determined. For example, FIG. 6 is super block dominator graph obtained for the code unit "new_count". However, instead of computing the super block priorities as described in the Background section above, a different method is provided herein for determining priority values of the super block nodes. In one embodiment, the weight (i.e., priority) value for each super block node may be the same as described in the Background section, i.e., its source code line count with the exception that the weight of each of super block that also identifies an invocation block is computed differently to thereby take into account at least a portion of the code coverage resulting from the invocation of one or more invocable program elements from the invocation block. For example, the priority of each super block of the graph in FIG. 6 now needs to consider the coverage impact of function calls to m1 and m2 (note that node n8 and node n10 of FIG. 2 are now invocation blocks). That is, covering the two nodes n8 and n10 also guarantees coverage of some part of methods m1 and m2. The new priority calculations of the global priority estimation method includes the following steps (also show in FIG. 8).

Step 804: Determine the invocation-blocks of a control flow graph G (alternatively, data flow graph) for the code unit CU. Let the identifier IB_LIST$_0$ denote the collection of zero or more invocation-blocks determined.

Step 808: For each invocation-block (IB) on IB_LIST$_0$, determine the node ($N_{IB}$) identifying IB in the corresponding super block dominator graph (SBG) for G, and then determine an initial priority value for $N_{IB}$, and assign this initial value to the priority value accumulator, $P_{IB}$. Note that such an initial priority value may be one of: the number of lines of source code identified by $N_{IB}$, the number of object code statements corresponding to $N_{IB}$, the number basic data type fields (e.g., integer, character, real, etc.) whose value can change during execution of the code identified by $N_{IB}$, or various other code coverage metrics.

Step 812: Assign the identifier IB_LIST to reference IB_LIST$_0$.

Figure 9A:
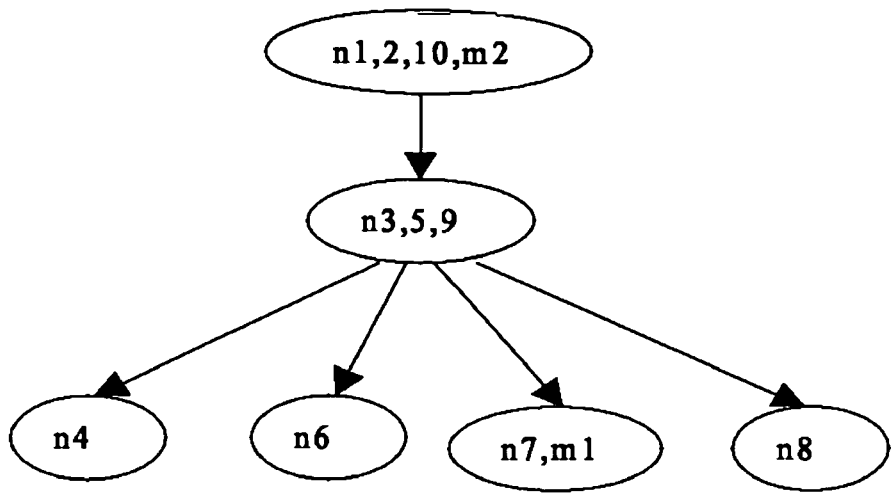
FIG. 9(a) is an illustration of the data structures for representing a modified super block dominator graph for the function "new_count" (disclosed in the Detailed Description section hereinbelow), wherein information identifying the invocable program elements m1 and m2 are provided in (or associated with) the nodes of the modified super block dominator graph.

Step 816: For each of the invocation-blocks X on IB_LIST, and for each instance of an invocable program element in X, add the invocable program element's name (or other identifying information therefor) to the super block node $N_X$ identifying X, thus obtaining a new version (SBG$_1$) of the super block dominator graph SBG. For example, for the super block dominator graph of FIG. 6 (i.e., for the method "new_count"), the new super block dominator graph SBG$_1$ of FIG. 9(a) is obtained, wherein the super block node "n1,2,10" (of FIG. 6) now also includes information for identifying m2 (i.e., such information illustratively denoted "n1,2,10,m2" in FIG. 9(a)), and the super block node "n7" now also includes information for identifying m1 (i.e., such information illustratively denoted "n7,m1" in FIG. 9(a)). Note that the information identifying such an instance of an invocable program element may include: the original node ID list and the name of the invoked element.

Figure 9B:
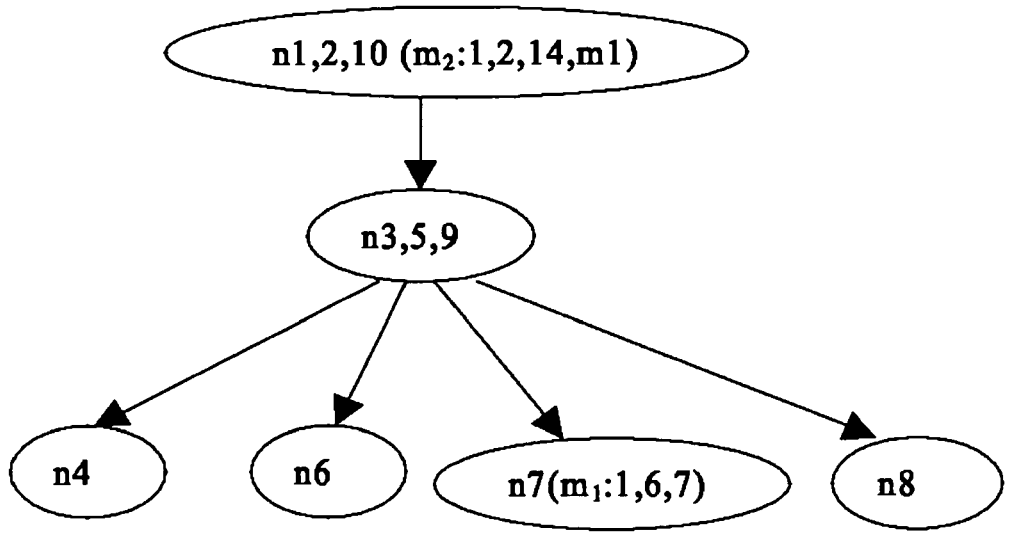
FIG. 9(b) shows a further modified version (from that of FIG. 9(a)) of the super block dominator graph for "new_count", wherein information identifying the method m1 since m1 is guaranteed to be invoked when the method m2 is invoked.

Step 820: For each of the invocation-blocks X on IB_LIST, and for each instance (INST) of an invocable program element (IPE), determine the corresponding super block node (SBN$_{INST}$) of SBG$_1$ (e.g., FIG. 9(a)), then perform the following:

(i) Replace (or modify) the name (or other identifying information therefor) for IPE identified in (or associated with) the super block node SBN$_{INST}$ with an identification of the super block node ($M_{INST}$) from IPE's super block dominator graph, wherein the node $M_{INST}$ identifies the entry point (e.g., line of source code) executed when the instance INST is invoked during execution of CU. For example from the super block dominator graph for m1 shown in FIG. 7(a), the super block node corresponding to an entry point to the method m1 is identified by the node "n1,6,7", and from the super block dominator graph for m2 shown in FIG. 7(b), the super block node corresponding to an entry point to the method m2 is identified by the node "n1,2,14". Accordingly, FIG. 9(b) shows a further modified version of the super block dominator graph for "new_count", wherein information identifying the entry points to such invocable program elements is associated with each corresponding super block node. In particular, since node 14 of the control flow graph for m2 invokes m1, the data for node "n1,2, 10,m2" is enhanced with information identifying m1 since m1 is guaranteed to be invoked;

(ii) Determine the priority value ($V_{INST}$) of $M_{INST}$ within IPE's super block dominator graph. Note that such a priority value may be the number of lines of source code identified by $M_{INST}$, the number of object code statements corresponding to $M_{INST}$, the number basic data type fields (e.g., integer, character, real, etc.) whose value can change during execution of the code identified by $M_{INST}$, or various other code coverage metrics; and (iii) Obtain from IB_LIST$_0$ for the original graph G, the super block node $N_{LB}$ identifying the code that when executed causes the execution of INST, and add $V_{INST}$ to the priority value accumulator $P_{IB}$.

Step 824: For each invocable program element IPE identified in Step 820, set IB_LIST to now identify the (any) invocation-block(s) identified by the node $M_{INST}$ from IPE's super block dominator graph, and then perform Steps 816 through 824. Thus, for a super block node $M_{INST}$, if it, in turn, identifies an entry point (e.g., line of source code) of one or more additional invocable program elements, then the code corresponding to the super block node $M_{INST}$ is analyzed for determining priority values corresponding to such additional invocable program elements. For example, if the super block node "n1,6,7" of the super block dominator graph for m1 identified an additional invocable program element m3, then the priority value for this additional program element would be determined and added to the priority value accumulator $P_{IB}$ corresponding to each of the super block nodes "n1,2,10" (since this node identifies m2 which in turn identifies m1 which in turn identifies m3), and "n7" (since this node identifies m1 which in turn identifies m3). However, if an invocable element has already been considered, it does not need to be expanded (weight counted as zero) when it is encountered again.

Step 828: After all iterations of the above Steps 804 through 824 above are performed, each of the super block nodes $N_{IB}$ identifying an invocation-block for the graph G has a priority value associated therewith. Accordingly, in the present step, the priority for each of the other super blocks of the super block dominator graph SBG is now determined, e.g., in a conventional manner as described in the Background section hereinabove.

Accordingly, in one embodiment, such super block priority can used to identify the importance of various portion(s) (e.g., a line of codes) of an input software program, wherein the greater the priority of such a portion, the more important that the portion is executed by at least one test case. That is, execution of this portion implies that a greater amount of the program (e.g., a greater number of additional program code lines) is executed in comparison to the amount of the program executed when another portion of the software program of lower priority is executed by a test case.

Figure 9C:
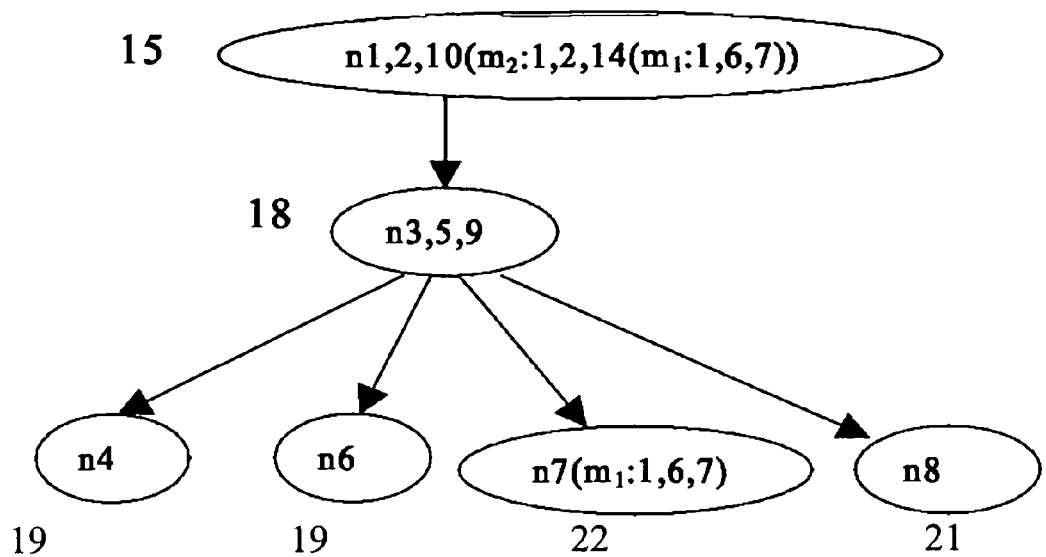
FIG. 9(c) shows a further modified version (from that of FIG. 9(b)) of the super block dominator graph for "new_count" resulting from the performance of the steps of FIG. 8.

For the super block dominator graph of the method "new_count" (FIG. 6), FIG. 9(c) shows a representation of this super block dominator graph from the application of Steps 804 through 828 hereinabove, wherein the integers external to the nodes are the computed priorities for the nodes. For example, the priority of the super block node "n1,2,10(m2:1,2,14(m1: 1,6,7))" of FIG. 9(c) (which uniquely corresponds to the node "n1,2,10" of FIG. 6) is the summation of: (i) the weights for the method "new_count" node "n1,n2,n10" (i.e., a weight of 9), plus (ii) the weight for the method m2 node "1,2,14" (i.e., a weight of 3), plus (iii) the weight for the method m1 node "1,6,7" (i.e., a weight of 3). Thus, the priority of the super block nodes "n1,2,10(m2:1,2,14(m1:1,6,7))" (FIG. 9(c)) and "n1,2,10" (FIG. 6) is 15. Accordingly, upon reviewing the priorities in FIG. 9(c), the highest priority node is now "n7 (m1:1,6,7)" (equivalently, node "n7" of FIG. 6) having a priority value of 22. Thus, in comparison to the priorities shown in FIG. 6, where node "n8" had highest priority, when priorities from invocable code units are taken into account according to the above Steps 1 through 6, the most important portion of "new_count" to be tested now corresponds to node "n7" (FIG. 6) which identifies line 12 (FIG. 2) (i.e., "else if (m1(state)){"") in "new_count". Accordingly, since in the present embodiment, each line of code corresponds to one unit of priority value, a test case that executes the line of code corresponding to "n7" is also guaranteed to execute 22 lines of code.

Relaxed Priority Estimation Method

Each of the dominator methods described above for computing priorities is both computationally intense, and may require substantial computer storage. For example, both the prior art dominator analysis method described in the Background section above as well as the novel dominator analysis method described immediately above has a computational complexity of O(N+E) where N is the number of nodes in the control flow graph for a code unit to be analyzed, and E is the number edges in this control flow graph. Moreover, since for each invocable program element (e.g., method or function) at least two graphs must be stored, e.g., the control flow graph derived therefrom, and the corresponding super block dominator graph, the computer storage can be extremely high for lengthy code units. Accordingly, a new priority estimation method is presented here that has computational complexity of O(ln N) when N is the number of nodes in, e.g., the control flow graph for a code unit to be analyzed. Moreover, this new priority estimation method substantially only needs storage for storing the control flow graph of the code unit to be analyzed. Furthermore, this new priority estimation method can be easily extended to include the global priority estimation method for situations when method/function dependency is involved. This is very useful for testing complex software with very large number lines of code. The global priority estimation method can point out the highest priority code inside a very large code base.

Relaxed Estimation

Assuming that the code coverage metric for determining coverage priorities is based on the lines of code executed, when the node priority calculations in the dominator analysis methods above determine a super block node priority (as the number of lines of code that will be executed), the specific code lines to be executed can be determined, as one skilled in the art will understand. In the description hereinbelow, a method for computing a different set of priority values is disclosed, wherein these new priorities have a more relaxed interpretation. That is, instead of a priority value representing the number of lines of code that are guaranteed to be executed in the sense that they can be identified (as in the dominator analysis methods above), the new priority estimation method (also denoted herein as a "relaxed priority estimation method") determines each priority value as a number of code lines that at least will be executed, but the specific code lines can not be determined. For instance, assume that the code coverage metric for determining coverage priorities is based on the lines of code executed. For a (control flow graph) node (N) having a priority of 13, determined according to the new priority estimation method, this priority value indicates that at least 13 code lines will be executed when the code lines for the node N are executed; however, it is not possible to identify the exact collection of 13 code lines that will be executed.

For a given program code representation of a (software) system, calculation of code priorities using the relaxed priority estimation method includes the following steps (also shown in FIG. 10):

Step 1001 Generate a graph G of the program code (i.e., the graph being a control flow graph representing the program code, or alternatively, a data flow graph representing the program code). Note, each node of the graph G identifies a statement-block (as this term is described in the Terms and Description section hereinabove) of the program code from which G was generated, or in some circumstances may identify no portions of the program code, as discussed in Step 1003 hereinbelow.

Step 1002 Determine the collection of all one or more "start nodes" of G, wherein each such start node is identified as a node having no directed edges pointing to the node. Note that each generated graph G will have at least one such start node, as one skilled in the art will understand. For example, in FIG. 2, there is a single such start node: "n1,2,3,4,5".

Step 1003 Determine the collection of all one or more as a "exit nodes" of G, wherein each such exit node is identified as node having no directed edges pointing to the node. Note that each such graph G generated can be generated so that there is at least one such exit nodes; however, such an exit node may or may not identify a portion of the program code (e.g., if a programmatic loop terminates the program code, then an additional exit node may be provided in G that does not identify any portion of the program code). Referring to FIG. 2 again, the node "n10:17,18,19" is the only exit node.

Figure 11:
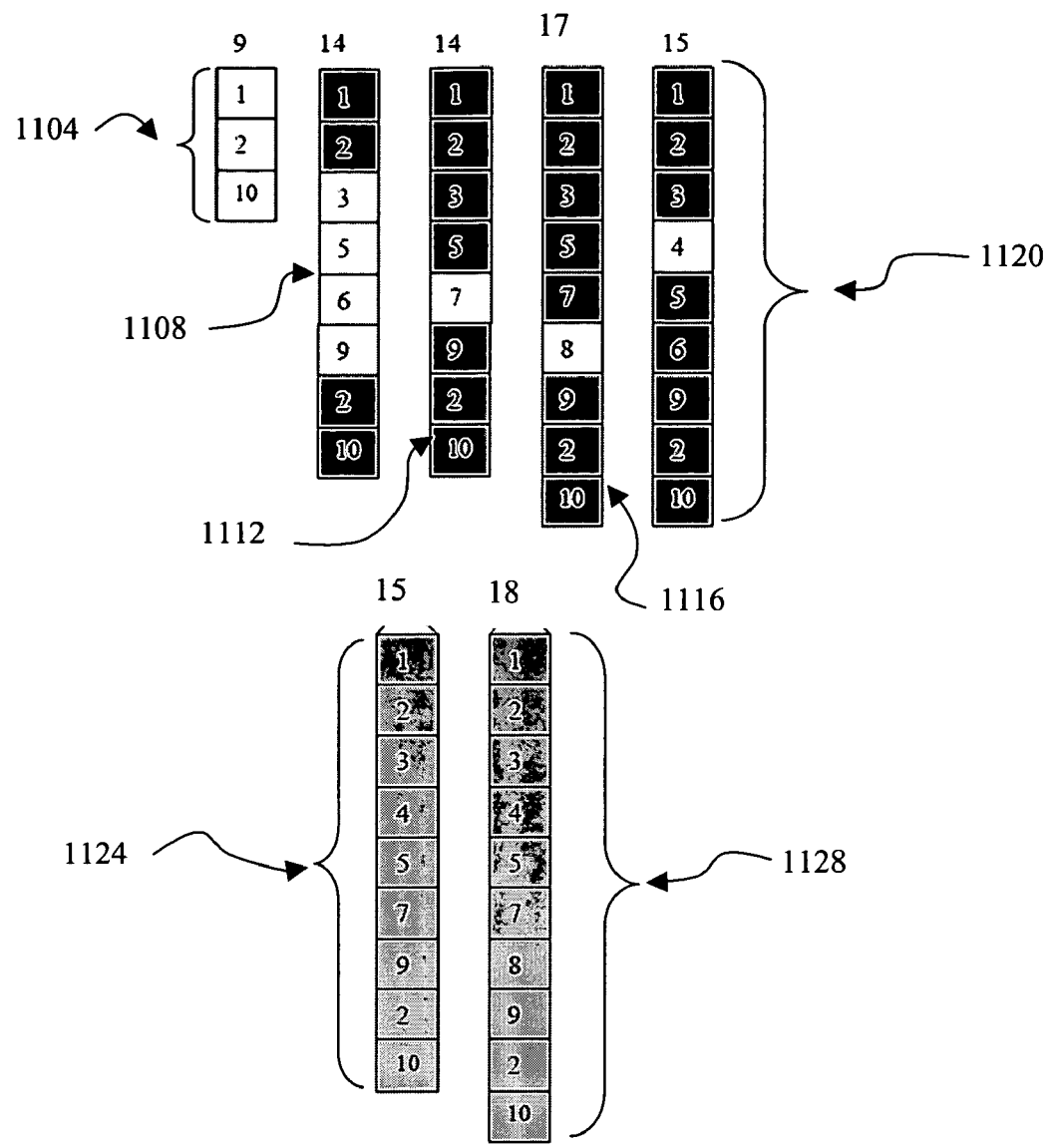
FIG. 11 shows pictorial representations of the acyclic paths (i.e., representations 1104 through 1128) for the program code of FIG. 2.

Step 1004 Generate data identifying all acyclic paths from a start node of the graph G to an exit node of the graph G; i.e., for each start node (SN) determined in Step 1002, determine a data representation of each acyclic path from SN to one of the exit nodes determined in Step 1003. Accordingly, if a start node $SN_0$ commences a first acyclic path ending at an exit node $EN_1$, and $SN_0$ also commences a second acyclic path ending at a different exit node $EN_2$, then representations of both the first and second acyclic paths will be generated in this step. Note that for each acyclic path, the representation generated for identifying the path may be, e.g., a variable length list or other data structure that retains information characterizing the sequential order of the nodes on the path. FIG. 11 shows pictorial representations of the acyclic paths (i.e., representations 1104 through 1128) for the program code of FIG. 2. In FIG. 11, each box with an integer therein identifies a corresponding node of FIG. 2. For example, for the first (shortest) acyclic path 1104, the box having the integer "1" represents the node "n1:1,2,3,4,5" of FIG. 2, the box having the integer "2" represents the node "n2:6", and the box having the integer "10" represents the node "n10:17,18, 19".

Step 1005 Calculate a weight for each node (N) of the graph G, wherein the weight is indicative of at least a minimum number of code lines that are executed when executing only the portion of the program code identified by the node N. For example, referring to FIG. 2 again, the weight of node "n1:1,2,3,4,5" is 5, and the weight of node "n2:6" is 1. Note, that instead of such weightings being based on "a minimum number of code lines", an alternative type of code unit may be used, e.g., program statements. Note that additional description of the node weighting computation is provided further below.

Step 1006 Calculate a path weight (i.e., also denoted as "weighted length") for each of the acyclic paths determined in Step 1004. Note that the path weight for such an acyclic path may be the summation of weights of the nodes in the path. Alternatively, the path weight for an acyclic path may be a monotonic function of such a summation, or a function that monotonically increases with increasing node weights along the path. However, nodes that appear multiple times on such a path have their weights only counted once. In FIG. 11, the number above each path representation is the path weight for the corresponding acyclic path identified by the representation. Thus, path representation 1104 has a path weight of 9 which is the summation of weights of node "n1:1,2,3,4,5" (weight=5), node "n2:6" (weight=1), and node "n10:17,18,19" (weight=3). The second path representation 1108 has a path weight of 14. Note that the weight of node "n2:6" is counted only once in the path representation 1108, even though it appears twice.

Step 1007 Sort the acyclic path data representations according to their lengths (i.e., the number of nodes on each path) so that the path representations are in ascending order. In FIG. 11, an example of a sorted order is shown, wherein the order is 1104, 1108, 1112, 1116, 1120, 1124, and 1128.

Step 1008 For each acyclic path representation in the sorted order (shortest path representation(s) first and longest path representation(s) last), traverse the path representation and mark the (any) node representations in the path representation that have appeared in the previous path representation traversals. For example, referring to FIG. 11 again, the path 1104 is considered first, and none of its nodes are marked since there are no previously considered acyclic paths. However, when path 1108 is considered, the grayed out boxes are representative of these node representations being marked according to this step. Similarly, the grayed out boxes on the remaining path representations indicate that these node representations being marked according to this step. Note that the last two path representations 1124 and 1128 each have all their node representations marked. Further note that such marking can be performed in various ways including setting a flag field for each node representation in an acyclic path data representation.

Step 1009 Determine the priority of each node N of the graph G as the minimum path weight (i.e., weighted length) of the acyclic path representation(s) identifying a representation of N that is not marked. Referring again to FIG. 11, from the first path representation 1104, the priority of nodes "n1:1,2,3,4,5", "n2:6", and "n10:17,18,19" is 9. From the second path representation 1108, the priority of nodes "n3: 7,8", "5n:10", "n6:11", and "n9:16" are 14. From the third path representation 1112, the priority of node "n7:12" is also 14. From the fourth path representation 1116, the priority of node "n8:13,14,15" is 17, and from the fifth path representation 1120, the priority of node "n4:9" is 15.

It is worth noting that the acyclic path with the shortest path weight should be larger or equal to the smallest leaf weight in a corresponding super block because the prior art dominator analysis method may not count all lines of code of an entire computational path through a program element being analyzed. Moreover, the relaxed priority estimation method does not need to generate any dominator graphs and yet can obtain substantially equivalent priorities.

The improvement of the relaxed priority estimation method as compared to the prior art dominator analysis method can be illustrated in the example shown in FIGS. 12A through 12C. A typical control flow graph 1204 is given in FIG. 12A (for program code not shown). Assume that each node of the graph 1204 identifies one source code line. The corresponding super block graph 1208 generated by the traditional dominator analysis is shown in FIG. 12B, wherein the corresponding priority values for the leaf nodes is given is shown below each leaf node. FIG. 12C shows a representation 1212 of acyclic paths obtained from graph 1204, wherein this representation identifies the node sequence: <1, 2, 3, 5, 6, 7, 9, 10> of FIG. 12A. Note the path weight for path 1212 is 8 (as shown below the representation 1212). Additionally FIG. 12C shows a representation 1216 of the acyclic path from graph 1204, wherein this representation identifies the node sequence: <1, 2, 4, 5, 6, 8, 9, 10>. Note the path weight for path 1217 is also 8 (as shown below the representation 1216). Representations of an additional two of the acyclic paths that can generated from graph 1204 could also be shown. However, each such additional path has the same path weight of 8.

Analysis of the control flow graph 1204 shows that any execution of the corresponding program code (not shown) would execute at least 8 nodes, which is correctly predicted by the new priority estimation method; i.e., since all path weights are 8, the priority determined for each node of graph 1204 is 8. However, the prior art dominator analysis method only gives a priority of 7 to each of the leaf nodes of graph 1208 (FIG. 12B). This lower priority is due to the dominator analysis method not fully taking into account all nodes on at least some of the computational paths through the program code; i.e., the prior art dominator analysis method is a more conservative or restrictive technique for computing node priorities. Said another way, the prior art dominator analysis method determines priorities based on particular groups of nodes (from the corresponding flow control graph or data flow graph) that are guaranteed to be executed, but such priorities may be lower than necessary. Accordingly, the prior art dominator analysis method often indicates a smaller coverage of the program code than the minimum code coverage that is actually obtained from executing test cases. In some instances, however, both the prior art dominator method and the relaxed priority estimation method may provide identical values. For example, to cover the node "n10:17,18,19" in FIG. 2, at least nodes "n1:1,2,3,4,5" and "n2:6" will be covered according to the relaxed priority estimation method, i.e., statements 1-6, 17, 18, and 19 of "new_count" will be covered. Thus, the node "n10: 17,18,19" has a priority of 9, which is the same priority as determined by the prior art dominator analysis method (see FIG. 6).

Combining the Global Priority Estimation Method with the Relaxed Priority Estimation Method The above relaxed priority estimation method can be augmented so that code coverage priorities are more accurately determined by using priority information obtained from invocable program elements. In particular, the technique described above for using the global priority estimation method can be used with the relaxed priority estimation method. The combination of the relaxed priority estimation method and the global priority estimation method shall be referred to herein as the "relaxed global priority estimation method".

Figure 10:
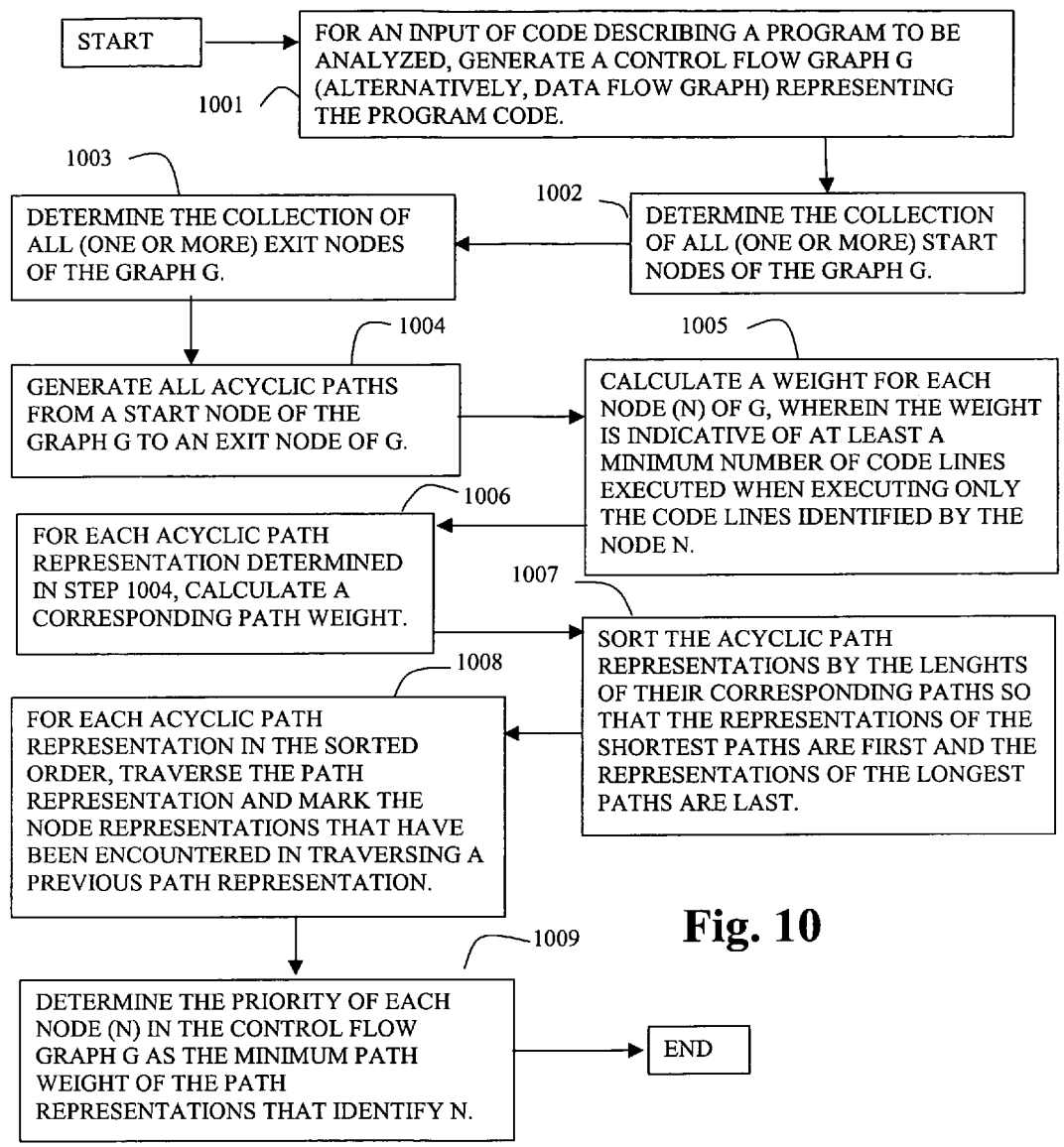
FIG. 10 is a flowchart of the steps performed for computing coverage priority values in a novel manner denoted herein as the "relaxed priority estimation method", wherein this novel method determines each priority value as a number of code units that at least will be executed, but which specific code units executed may not be determined prior to execution.

For determining node priorities when one or more of the nodes (from, e.g., a control/data flow graph) identify one or more invocable program elements (such nodes also denoted "invocation nodes" herein), additional processing must performed by the new relaxed priority estimation method. In particular, in the Step 1005 of FIG. 10, the node weights must be computed differently for the nodes that identify an invocable program element(s). That is, for such nodes, a recursive version of the flowchart of FIG. 10 can be provided, wherein the weight for each such node takes into account a weight of the invocable program element(s) identified by the node. More particularly, for each node identifying an invocable program element, a new copy of the flowchart of FIG. 10 is activated with the code of the invocable program element being the input to this new copy of the flowchart. To perform this additional processing, the modified Step 1005 may be described in pseudo-code as follows:

Pseudo-Code For Step 1005
```
For each node (N) of G do {
    If N does not identify an invocable program element then
        Node_wt(N)<—The minimum number of code lines
            that are executed when executing only the portion of
            the input program code identified by the node N, or,
            some other measurement related to the minimum
            number of code lines executed, e.g., the number of
            software program language statements executed;
    Else // N identifies at least one invocable program element
    For each invocable program element (IPE) identified by N
        do {
        If a weight (IPE_wt) for IPE has not already been deter-
            mined then
            If an invocation of the flowchart of FIG. 10 with IPE
                as the input code in
                Step 1001 is currently active then
                    // IPE is recursive now known to be recursive
                    IPE_wt<—0; /* do not count code coverage for
                    IPE more than once */Else
            {/* IPE is not known, as yet, to be recursive, and a
                weight for IPE needs determining */
                Invoke the flowchart of FIG. 10 with IPE as the
                    input code in Step 1001 so that all nodes of the
                    graph (G_{IPE}) corresponding to IPE will have
                    their weights determined;
                For each path (P) from an entry node in the graph
                    G_{IPE} to an exit node in G_{IPE} do /* determine a
                    path weight (denoted "weighted path length"
                    herein) for the path P */
                    Path_wt(P)<—sum of the weights of the nodes on
                        P;
                // determine a weight for IPE
                IPE_wt<—the minimum Path_wt(P) over all paths P
                    in the graph G_{IPE};
            }
        }// a weight for IPE has been determined
        Node_wt(N)<—Node_wt(N)+IPE_wt;
    }/* the weights of all invocable program elements have
        now been added to the weight of the node N */
    // now add the weight(s) (if any) corresponding to any other
        portions of code from the graph G that are identified by
        the node N.
    Node_wt(N)<—Node_wt(N)+(the number of code lines
        identified by N wherein none of these code line identify
        an invocable program element, or some other measure-
        ment related to such a number of code lines, e.g., the
        number of software program language statements iden-
        tified by N wherein none of these statement identify an
        invocable program element;
    }// all nodes N of G now have a weight calculated as per
Step 1005 of FIG. 10
```

The pseudo-code statement above that determines IPE_wt as the minimum Path_wt(P) over all paths P in the graph $G_{IPE}$ can be determined using Dijkstra's$_{[DD1]}$ algorithm as one skilled in the art will understand. In particular, Dijkstra's algorithm maintains two sets of vertices S and Q for a graph such as $G_{IPE}$. Set S contains all vertices for which it is known that the value d[v] is already the cost (i.e., weighted length herein) of the shortest path, and the set Q contains all other vertices. Set S starts empty, and in each step one vertex is moved from Q to S. This vertex is chosen as the vertex with lowest value of d[u]. When a vertex u is moved to S, the algorithm relaxes every outgoing edge (u,v). In the following pseudo-code for Dijkstra's algorithm, the statement u:=Extract-Min(Q) searches for the vertex u in the vertex set Q that has the least d[u] value. That vertex is removed from the set Q and then returned. Q :=update(Q) updates the weight field of the current vertex in the vertex set Q. Pseudo-code for Dijkstra's algorithm follows.

Pseudo-Code For Dijkstra's Algorithm
```
1 function Dijkstra(G, w, S)
2 for each vertex v in V[G] // Initialization
3 do d[v]:=infinity
4 previous[v]:=undefined
5 d[s]:=0
6 S :=empty set
7 Q :=set of all vertices
8 while Q is not an empty set
9 do u:=Extract-Min(Q)
10 S:=S union {u}
11 for each edge (u,v) outgoing from u
12 do if d[v]>d[u]+w(u,v)//Relax (u,v)
13 then d[v]:=d[u]+w(u,v)
14 previous[v]:=u
15 Q :=Update(Q)
```

If a shortest (weighted length) path between vertices s and t, is all that is desired, then the above pseudo-code can terminate at line 9 if u=t.

The shortest path from s to t can be obtained by iteration as follows:
```
1 S :=empty sequence
2 u:=t
3 while defined previous[u]
4 do insert u ito the beginning of S
5 u:=previous[u]
```

Now sequence S is the list of vertices on the shortest path from s to t, or the empty, sequence if no path exists.

Thus, using the pseudo-code algorithms above in conjunction with the flowchart of FIG. 10, the relaxed global priority estimation method determines a priority-value for each control flow graph (alternatively, data flow graph) node for a program to be tested. Note that the relaxed global priority estimation method may be also applied to other coverage adequacy criteria such as the decision coverage criterion as defined previously. It is also important to note that the relaxed global priority estimation method disclosed herein provides a conservative approach to code coverage by counting only the lines of code that will definitely be covered if a given node is covered.

As an example of computing priorities according to the relaxed priority estimation method above, consider the method "new_count" hereinabove as an invocable program element IPE identified in the pseudo-code for step 1005 above. Recall "new_count" has a control flow graph corresponding to FIG. 2. Assume that the function "m2" of line 17 in "new_count" has a weight of 3. Accordingly, the relaxed priority estimation method will determine that "new_count" has a weight of 11, because the sequence (i.e., path) from "n1:1,2,3,4,5", "n2:6" to "n10:17,18,19" has a weighted path length of 11 (lines 1-6, 17, 18, and 19). That is, this path has the smallest weighted path length when compared to other paths through the control flow graph for "new_count". For example, the path n1, n2, n3, n5, n6, n9, n2, and n10 has a weighted path length of 17.

As an example of the use of the relaxed priority estimation method, assume that the weight of "m1" is 7, thus the weight of "n7:12" is 7. Moreover, assume as above that "m2" has a weight of 3. Then, for determining the weight of "n8:13,14, 15", the path <n1, n2, n3, n5, n7, n8, n9, n2, and n10>(each node being abbreviated to its first two characters) has a smallest weight length of 25. Thus, the priority of node "n8" is 25. Note that repeated node, e.g., "n2", is counted once. Since node "n8" has a higher priority than node "n5" (which a priority of 16), node "n8" has a higher coverage priority than node "n5", i.e., tests that cover node "n8" may have a higher priority for being generated than tests that cover node "n5". Thus by generating test cases that perform the code identified by node "n8" before generating test cases that perform the code identified by node "n5", more effective code coverage of the software being tested can be performed, likely with a reduced number of test cases.

Experimental Results

To test the relaxed priority estimation method against the prior art dominator analysis method, an both of these coverage priority techniques was implemented in the Java programming language. The relaxed priority estimation method made use of the global priority estimation method as described above in determining coverage priorities. Four target software modules were analyzed by each of the two coverage priority techniques, these modules ranged from thousands of lines of code to tens of thousands of lines of code. The four modules, were also written in the Java programming language. Two sets of experiments were conducted, a first set for determining the code coverage of the highest priority code portion identified by each of the coverage priority techniques, and a second set of experiments for determining the number of test cases needed to obtain a test coverage of at least 60% of each target module.

In the first set of experiments, the highest priority line of code identified by the prior art dominator analysis method, and the highest priority line of code identified by the novel relaxed priority estimation method was used to generate one test case for each of these high priority lines of code, and thereby determine their corresponding actual coverages. That is, for each such high priority code line (L) identified, its coverage corresponds to a number of related code lines that must be executed whenever the code line L is executed. Thus, a test case that executes, a higher percentage of the software system being tested is more likely to detect errors and/or failures in the software.

The table (Table 1) hereinbelow shows the results of the experiment, wherein each row identifies the comparative results from one of the experiments. The first column of the table provides the names of the software systems tested. Each cell in the second column shows the actual coverage (of the software system identified in the same row) of a test case generated from a line of code corresponding to the highest priority as determined by the prior art dominator analysis. Each cell in the third column shows the actual coverage (of the software system identified in the same row) of a test case generated for performing a line of code corresponding to the highest priority as determined by the novel relaxed priority estimation method using the global priority estimation method disclosed above. Each cell in the fourth column shows the coverage improvement of the new relaxed priority estimation method vs. the prior art dominator analysis method.

TABLE 1

|    | Coverage using Conventional Dominator Analysis (not global) | Coverage using Relaxed Dominator With Global View | Percentage improvement of new method |
|----|---|---|---|
| P1 | 34% | 35% | 3% |
| P2 | 18% | 26% | 40% |
| P3 | 9% | 15% | 60% |
| P4 | 32% | 47% | 50% |

In the second set of experiments, the number of test cases needed to reach 60% of software overall code coverage in a number of software systems was determined for each of the prior art dominator analysis, and the novel relaxed priority estimation method. Table 2 below provides a summary of the results, wherein each row of Table 2 identifies the comparative results from one of the experiments. The first column of Table 2 provides the software product names that were tested. Each cell in the second column of Table 2 shows the number of test cases needed to reach 60% software code coverage (of the software system identified in the same row) using the conventional prior art code coverage analysis. Each cell in the third column of Table 2 shows the number of test cases needed to reach 60% software code coverage (of the software system identified in the same row) using the novel relaxed priority estimation method combined with the global priority estimation method. As it can be seen from Table 2, the reduction in the number of test cases is substantial when the relaxed priority estimation method is used. It is believed that the reason for this is that the conventional prior art dominator analysis does not consider the global dependency priority information (such as priority information derived from subprograms and object-oriented methods) in determining code coverage. In particular, the prior art dominator analysis method needs to generate tests going through each object-oriented method one by one.

TABLE 2

|    | Prior art Dominator Analysis | Relaxed Dominator using the global priority estimation method | Percentage reduction of test cases needed |
|----|---|---|---|
| P1 | 2 | 1 | 50% |
| P2 | 53 | 24 | 60% |
| P3 | 287 | 105 | 60% |
| P4 | 695 | 384 | 50%. |

In addition to code prioritization, the prior art dominator analysis method is also often used to reduce the number of probes in code instrumentation, wherein such probes may include constraints and/or code invariants that are attached and performed at particular points within the code of a software system to detect software faults. Since the execution of the high priority code lines identified by the relaxed priority estimation method (preferably in combination with the global priority estimation method) causes a greater number of code lines to be performed, appropriately designed probes attached for execution with these high priority code lines can detect software faults over a greater portion of the software system being tested. Accordingly, it is a further aspect of the present disclosure to reduce the probe overhead (i.e., the code instrumented into the original program to record whether certain lines in the program have been executed) to be less than 3% of the total amount of program code (e.g., as measured by the number of code lines). Moreover, for a software system to be tested, and its corresponding control/data flow graph (G), a line of code selected from a node of G having the maximal priority, such a probe can be determined and attached adjacent to the line of code by: (i) determining whether the code defining the probe is to be inserted at a point immediately before or after the line of code, (ii) determining one or more constraints and/or code invariants that if violated at the probe insertion point indicate the occurrence of a fault in the execution of the software system, (iii) encoding the determined constraints and/or code invariants into one or more probe code lines, and (v) inserting a programmatic statement(s) at the probe insertion point for performing the probe code lines.

Automatic Testing System with Automatic Test Data Generation

The relaxed priority estimation method (preferably in combination with the global priority estimation method) may be also incorporated into an automatic software code testing system. One embodiment of such an automatic software code testing system 1304 is show in FIG. 13. The automatic software code testing system 1304 includes a component 1308 (denoted a "relaxed priority estimation component" herein) for performing, in one embodiment, the relaxed priority estimation method described hereinabove (e.g., the flowchart of FIG. 10) when a software code 1310 to be tested is input to the automatic software code testing system 1304. However, in one embodiment, prior to the code of the software system code 1310 being input to the priority estimation component 1308, the software code 1310 is translated by a translator 1312 so that the output from the translator (also referred to herein as the "translated code") is in a lower level program language, e.g., wherein various data types represented in the lower level program language, and/or the set of operations that can be performed in the lower level programming language is reduced. For example, Boolean operations may be translated into branching instructions in the lower level language.

In one embodiment, the lower level language is known in the art as Java bytecode (referred to as merely "bytecode" herein). Bytecode can be a computer language which, e.g., is frequently used as a language into which Java computer code is translated/compiled (although translation and compilation are in general considered different processes, these terms as well as their verb forms will by considered synonymous herein). Since bytecode can be translated fairly directly into computer specific machine code (e.g., the translator is relatively simple), bytecode is extremely portable between computers having different architectures and/or operating systems; moreover, since much of the processing for translating a higher level language such as Java into machine language is performed in the translation into bytecode, computers with substantially reduced software and hardware capabilities may be able to translate bytecode and execute the resulting computer dependent instructions. Accordingly, bytecode may be transmitted, via a network, to various reduced functionality computational devices for providing instructions for such devices.

Figure 13:
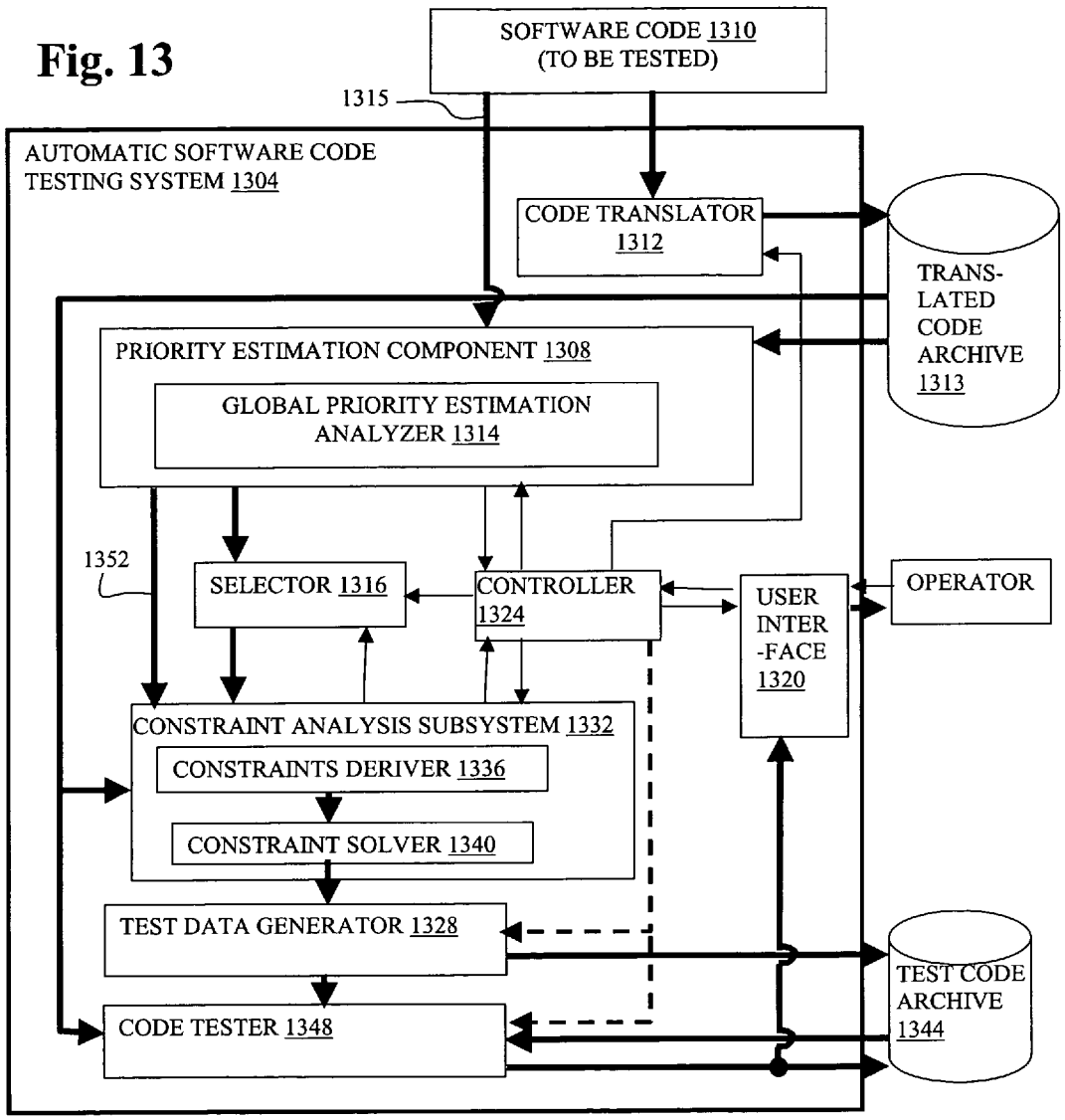
FIG. 13 is a block diagram of a novel automatic software code testing system disclosed herein.

Note that the code translator 1312 may output its translated code to a translated code archive 1313 from which this translated code can be accessed by other components of the automatic software code testing system 1304 as shown in FIG. 13 and as described hereinbelow. However, in one alternative embodiment, the code translator 1312 may provide access to its translated code directly to other components of the system 1304. Additionally note that in some embodiments, the code translator 1312 may be not be activated for performing a translation of the software code 1310; e.g., the software code 1310 may be already translated. In such a case, the software code 1310 may be input directly to the translated code archive 1313 and/or provided directly to other components of the automatic software code testing system 1304 as is illustrated by arrow 1315.

The priority estimation component 1308 preferably includes a component 1314 (denoted a "global priority estimation analyzer" herein) for performing the pseudo-code variation of Step 1005 of FIG. 10 described hereinabove. Additionally, the automatic software code testing system 1304 includes a selector 1316 for selecting from among the code units provided with priorities output by the priority estimation component 1308. The selector 1316 selects code units with higher priorities first; i.e., the selected code units that have priorities greater than or equal to the priorities of all non-selected code units. An operator input to the automatic software code testing system 1304 (via the user interface 1320 and the controller 1324) may be used to control the operation of the automatic software code testing system 1304. For example, such operator input may be used to instruct the selector 1316 as to how to select code units, wherein the selector may select code units by one or more of: (a) selecting a predetermined number of code units, (b) selecting the number of code units dependent upon the summation of their priorities (e.g., for a code coverage of 60%, the summation of the highest code unit priorities divided by the total number of code units in the software system to be tested should be at least 0.60), (c) selecting the code units iteratively depending upon feedback information from a test data generator 1328 described hereinbelow (or another component) wherein such feedback may be indicative of the number of distinct code units that have been executed by test cases generated thus far, and/or (d) selecting a set of code units that are on execution paths (through the software system being tested), wherein such paths are more dissimilar than the path for another set of code units.

A constraint analysis subsystem 1332 receives one or more high priority code units, e.g., lines of code (of the software code 1310 or its translated code) output by selector 1316, and uses the representation of the control/data flow graph generated by the component 1308 to perform the following steps:

(a) For each high priority code unit (L) selected for covering at least a portion of the software code 1310 (or its translated code), the constraint analysis subsystem 1332 derives a corresponding collection of one or more code constraints for use in determining test code for testing the software code 1310 (or its translated code). In particular, if data is identified that satisfies these constraints (i.e., according to (b) immediately below), then this data can be used to generate code a corresponding test case. To generate such constraints, the constraint analysis subsystem 1332 determines, for each selected high priority code unit (CU), an executable path through the software code 1310 (or its translated code) that includes CU, Such a path is determined using the representation of the control/data flow graph for the software code 1310 (or its translated code). That is, the following substeps are performed:

(i) Determine a path ($P_{CU}$) through the control/data flow graph that includes the node identifying the code unit CU, wherein the path $P_{CU}$ has not been determined in this substep before in attempting to determine constraints corresponding to CU;

(ii) If no path $P_{CU}$ can be determined, then no constraints can be generated that correspond to CU; so terminate; otherwise continue to substep (iii);

(iii) A determination is made as to whether the path $P_{CU}$ is feasible or infeasible, wherein a path is infeasible if there is a collection of contradictory constraints that would be required to be satisfied in order to execute the code corresponding to the path $P_{CU}$, and the path $P_{CU}$ feasible otherwise;

(iv) If the path $P_{CU}$ is infeasible, then perform substep (i) again; and (v) If the path $P_{CU}$ is feasible, then traverse the path $P_{CU}$, and for each node (N) of the path, add (to any constraints already identified for the path $P_{CU}$) the constraint(s) on the data identified by the code unit(s) of N that would force the execution of the code identified by the node (N+1) following N on the path $P_{CU}$. Let CONSTRAINTS$_{CU}$ be the resulting collection of constraints obtained from inspecting each node N when the path $P_{CU}$ is traversed.

Note that this substep is referred to as "constraint derivation" hereinbelow, and the component for performing this step is identified as a constraints deriver 1336 in FIG. 13; and (b) For each collection CONSTRAINTS$_{CU}$ of code constraints determined in substep (a) immediately above, determine a corresponding data set (DS) satisfying the constraints of CONSTRAINTS$_{CU}$ (this substep referred to as "constraint solving" hereinbelow, and the component for performing this step is identified as a constraint solver 1340 in FIG. 13).

Further description of the constraint analysis subsystem 1332 and its components is provided hereinbelow.

Each data set DS from the constraint solver 1340 is output to the test data generator 1328. The test data generator 1328 uses each such data set DS to generate corresponding test code input data that can be used for writing test code for executing the software code 1310 in a manner that forces the execution of the software code 1310 to perform the corresponding code unit $L_{DS}$ used to obtain the corresponding data set DS (via the constraint derivation and constraint solving steps above). For example, if the derived constraints are: (0<obj.x<10) and (obj.x>5) and (obj.y=TRUE) and (obj.z="username") for an object "obj" having at least fields "x" (of integer data type), "y" (of Boolean data type), and "z" (of string data type), then the constraint solver 1340 might determine that the corresponding data set DS should include an instantiation of the object "obj" wherein (obj.x=6) and (obj.y=TRUE) and (obj.z="www.tryme.com"). Subsequently, this data set is be supplied to the test data generator 1328 to present to a user for selection from, e.g., among a plurality of such data sets, wherein the user can select some data sets to write test code for constructing an instantiation of the object "obj" and performing the following code:

obj.x:=6; obj.x:=TRUE; obj.z:="www.tryme.com";

Moreover, note that the test data generator 1328 may likely have to suggest various additional object instances and/or assignments for parameter values just to get the software code 1310 to execute. For instance, there may be environmental parameter values such as URLs, pathnames to files/databases, global debugging parameter values, event handlers, etc. that must be properly provided by the user for the software code 1310 to execute regardless of the desired path of execution therethrough. Thus, a user may interact with the test data generator 1328 for substantially manually writing the code for one or more test sets of the software code 1310 (or a translation thereof). However, in another embodiment, the test data generator 1328 substantially automatically generate coded test sets.

Each of the coded test sets generated using the test data generator 1328 is subsequently provided to a code tester 1348 for use in testing the software code 1310 (or a translation thereof). However, in one embodiment, the test data generator 1328 may be instructed to output its generated test sets to a test code archive 1344 such as a file, or database from which these test sets are then fetched by the code tester 1348 for use in testing the software code 1310 (or a translation thereof). Alternatively/additionally, such test sets may be provided directly to the code tester 1348. Regardless of the way the code tester 1348 receives the test sets, each such test set is used to construct tests to activate the software code 1310, and at least record the test results as to whether the software code 1310 malfunctioned or not. However, in at least some embodiments, the code tester 1348 may also perform one or more of the following tasks:

(a) Record the actual number of code units of the software code 1310 that are performed (i.e., covered) during the execution of the software system 1310;

(b) Record various outputs and/or changes to global parameter values and/or database entries associated with the execution of the software code 1310; and/or (c) Record the values of various software probes that have been inserted into the software code 1310 for diagnosing execution anomalies and/or executing code invariants provided by the probes.

Note that collectively these tasks are referred to herein as "test case execution". After obtaining the testing results, code tester 1348 may output such results to the test code archive 1344 and/or output at least a summary thereof to an operator via the user interface 1320.

Regarding the controller 1324, it may perform the following tasks:

(a) Receives operator commands, e.g., (1) for activating/deactivating the testing of the software system 1310, (2) for identifying the location of the software code 1310 code, (3) for specifying the locations of various inputs for the software code 1310 (e.g., databases, websites, etc.), (4) for specifying where various outputs identified above are to be directed, (5) for identifying the types of code units to be used (e.g., code lines, program statements, etc.), (6) for specifying the summary and/or notification information to be provided to, e.g., the operator, (7) for determining whether (and which one if more than one) code translator 1312 to use, (8) for specifying the code coverage desired during the testing of the software system 1310, (9) for specifying whether only the relaxed priority estimation method is to be performed (via the priority estimation component 1308) or whether the global priority estimation method is to be performed as well (via the global priority estimation analyzer 1314), (10) for specifying the location of files having one or more of the above specified data items.

(b) Outputs control messages/commands to other components of the automatic software code testing system 1304, e.g., (i) informs the code translator 1312 of whether it is to translate the software code 1310 (and optionally, the type of translation to perform);

(ii) informs the priority estimation component 1308 of: (1) the type of code units to use for determining priorities, (2) the type of graph data to generate (e.g., control flow graph data, or data flow graph data), and (3) whether to perform the global priority estimation method;

(iii) informs the selector 1316 of criteria to be used in selecting high priority code units that are to be covered by generated test cases as described hereinabove;

(iv) may inform the constraint analysis subsystem 1332 of the type of graph data (e.g., control flow graph data, or data flow graph data) from which constraints are to be generated as well as the locations of environmental or global parameter values whose values are required for generating constraints;

(v) informs the test data generator 1328 of where to direct the resulting test sets (e.g., to the test code archive 1344 and/or the code tester 1348);

(vi) informs the code tester 1348 of what output is desired to be captured and/or presented to the operator, as well as where to direct its output, and the format of such output.

Figure 14:
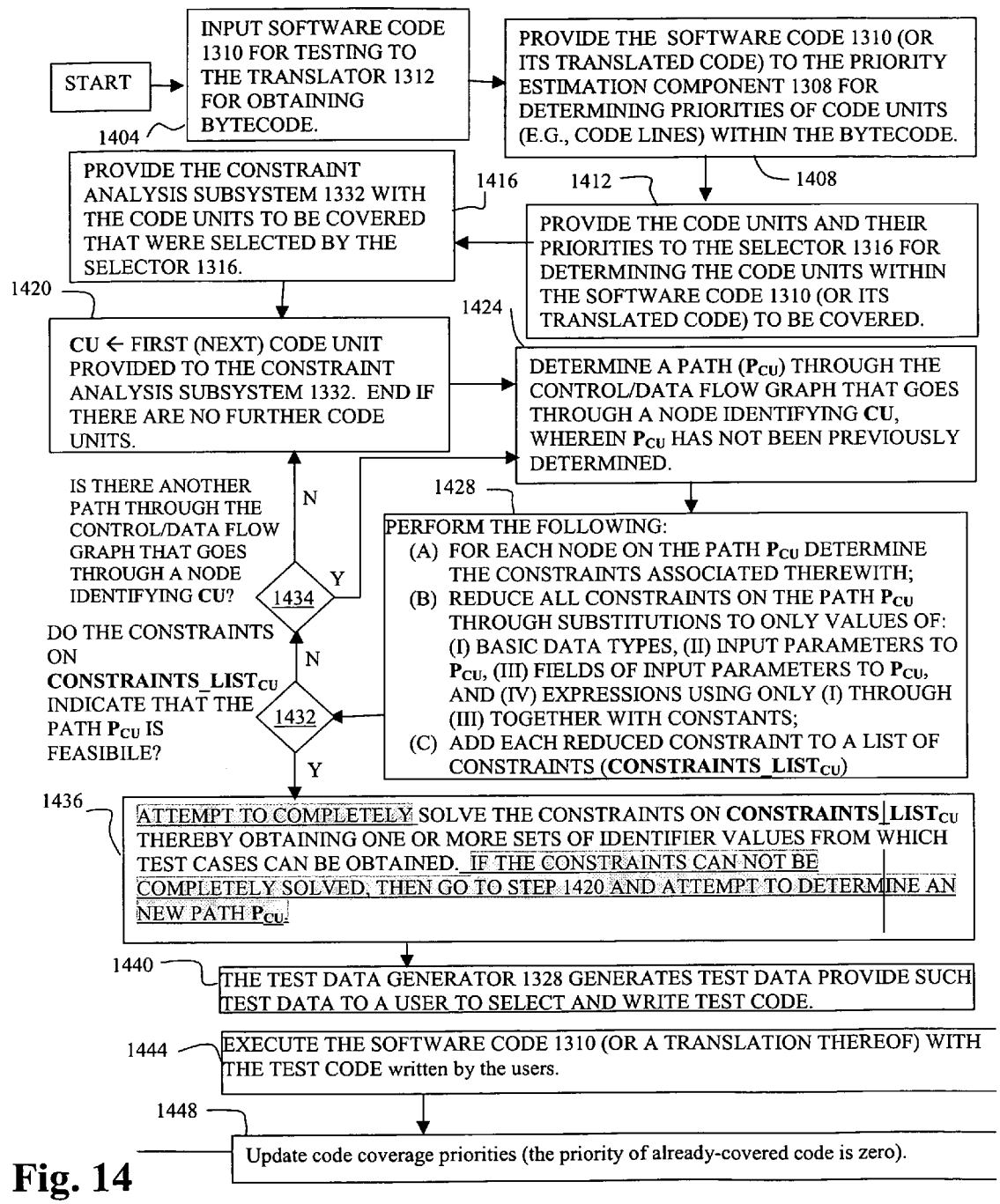
FIG. 14 is a flowchart of the high level steps performed by the automatic software code testing system of FIG. 13.

A flowchart of the high level steps performed by the automatic software code testing system 1304 is provided in FIG. 14. In step 1404, the software code 1310 for testing is, in one embodiment, input to the translator 1312 for translating into a lower level language, wherein, e.g., various data types represented, and/or the set of operations that can be performed is reduced from that of the software code 1310. In one embodiment, the lower level language may be Java bytecode as discussed hereinabove.

Note that when the software code 1310 is Java code and is subsequently translated into Java bytecode (or simple "bytecode" herein), Java operations such as Boolean OR (i.e., "||"), and AND (i.e., "&&") operations are translated into branching instructions in bytecode. Accordingly, the constraints generated by the constraint analysis subsystem 1332 are in general simpler than if the corresponding constraints were generated directly from Java code. However, there is a tradeoff in that the number of constraints generated increases. Such a tradeoff is believed worthwhile in that the software for generating the constraints (i.e., software implementing the constraint analysis subsystem 1332) is not as complex. FIG. 15 shows an example of a simple Java program, and FIG. 16 shows the corresponding bytecode, wherein the bytecode operators can be described as follows:

Iload %4 Load variable No. 4 for executing the next instruction.
iload__1 Load variable No. 1 for executing the next instruction
iload__2 Load variable No. 2 for execution.
iload__3 Load variable No. 3 for execution.
ifeq Determine if the loaded variable is equal to 0.
ifne Determine if the loaded variable is not equal to 0.
getstatic Get the instance of a class.
ldc Load a constant.
invokevirtual Invoke a method of the loaded class instance using the loaded constants as parameter values.

Accordingly, as can be seen from inspection of FIG. 16, the Boolean operations in FIG. 15 have been translated into branching operations in FIG. 16. For example, the expression "x1||x2||x3" in FIG. 15 corresponds to statements 0 to 9 in FIG. 16, as one skilled in the art will understand.

Note that it is within the scope of the present disclosure that the translator 1312 may translate the software code 1310 into other programming languages or indeed perform a translation into instructions specific to a particular computational device. For example, various assembler languages may also be the target of embodiments of the translator 1304. Additionally, the translator 1312 may provide the capability for translating the software code 1310 into one of a plurality of target languages. Also, it is within the scope of the present disclosure that an embodiment of the automatic software code testing system 1304 may not include a translator 1312, and instead provide the software code 1310 directly to the priority estimation component 1308.

Returning to FIG. 14, in step 1408, the resulting bytecode translation of the software code 1310 is provided to the priority estimation component 1308. Note that in at least one embodiment, the bytecode translation is output by the translator 1312 to the translated code archive 1313, and the priority estimation component 1308 fetches the bytecode translation from this archive upon receiving instructions to do so from the controller 1324. Subsequently, the coverage priorities for code units within the bytecode are determined, preferably according to the relaxed global priority estimation method described hereinabove with reference to FIG. 10. Thus, each code unit (e.g., code line or bytecode statement) has associated therewith a priority value related to the extent of coverage of the bytecode that is provided when the code unit is executed. Accordingly, a control/data flow graph of the bytecode translation is generated by the priority estimation component 1308. For example, if the Java code of FIG. 15 is provided to the automatic software code testing system 1304 as the software code 1310, and the translator 1312 translates it into the bytecode of FIG. 16, then the priority estimation component 1308 generates a data representation of the control/data flow graph (FIG. 17) of the bytecode of FIG. 16.

Figure 17:
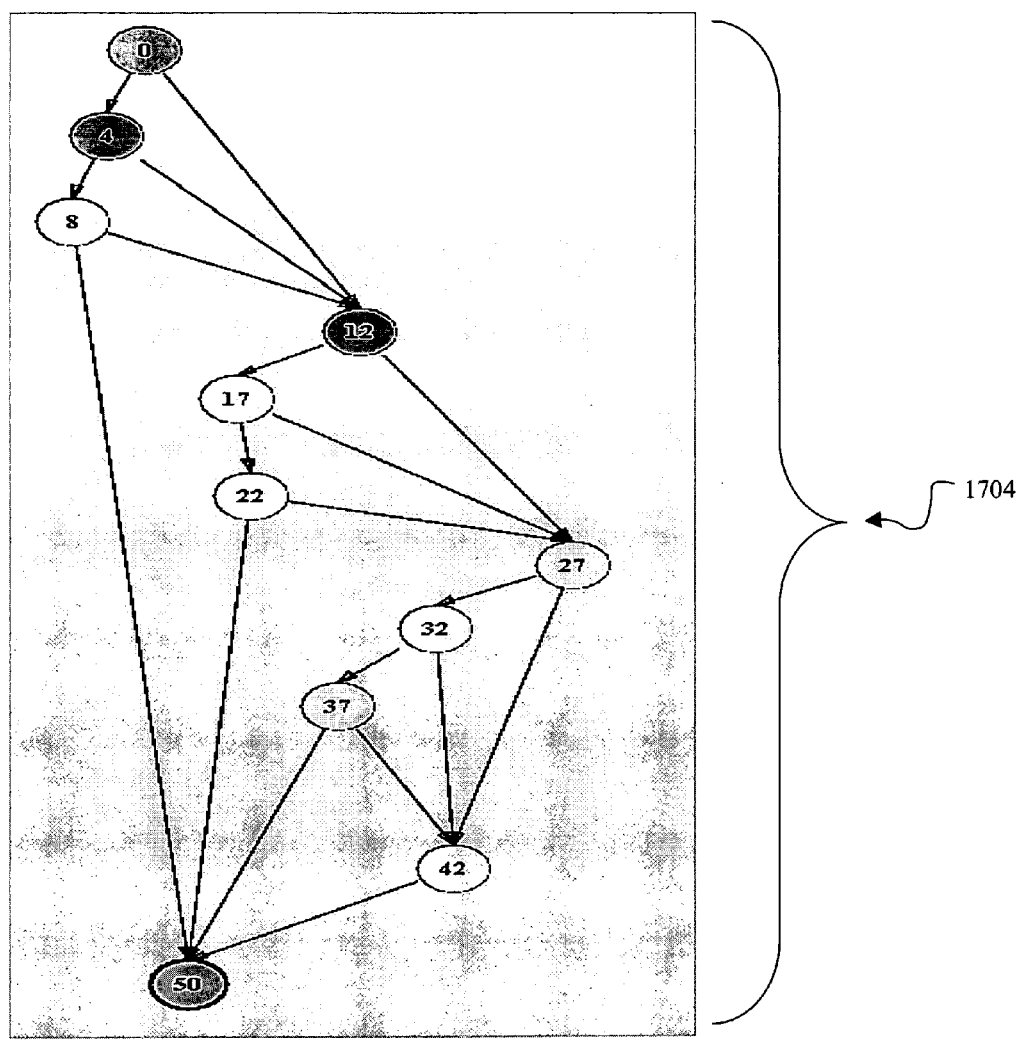
FIG. 17 which shows an illustration of a control flow graph 1704 for the bytecode of FIG. 16.

Referring to FIG. 17, this figure shows an illustration of a control flow graph 1704 for the bytecode of FIG. 16, each node in the graph 1704 is identified by the beginning statement number of the corresponding bytecode code statement of FIG. 16. For example, node 8 identifies bytecode statements 8 and 9, and node 12 identifies bytecode statements 12 and 14. Accordingly, when the priority estimation component 1308 applies, e.g., the relaxed global priority estimation method, node 37 (FIG. 17) is determined to be the highest priority for test coverage. Additionally, note that FIG. 17 shows that the operators such as the Boolean operators "&&" and "||" from the corresponding Java code of FIG. 15 have been translated into branches of new nodes in the graph 1704. For example, node 0, 4 and 8 represents the "or" operation of "x1||x2||x3", as one skilled in the art will understand. Accordingly, in the present example, the only operators and operands left from which constraints can be generated are those related to arithmetic operations such as greater than, less than, and equal.

It is also within the scope of the present disclosure for embodiments of the priority estimation component 1308 to utilize only the relaxed priority estimation method described above (and not the global priority estimation method). Alternatively, it is within the scope of the present disclosure for embodiments of the priority estimation component 1308 to utilize the global priority estimation method in combination with the prior art dominator analysis method (and not use the relaxed priority estimation method described hereinabove). Additionally, it is also within the scope of the present disclosure that an embodiment of the priority estimation component 1308 may use the prior art dominator analysis method without also using the global priority estimation method. Indeed, it is within the scope of the present disclosure that an entirely different technique for determining code coverage priorities of code units may be used in an embodiment of the automatic software code testing system 1304.

Referring again to FIG. 14, in step 1412, the code units (from, e.g., the bytecode translation), and their corresponding priorities are provided to the selector 1316 (FIG. 13) for determining or selecting the code units to be covered by test code to be generated/written. Various techniques may be provided by the selector 1316 as described hereinabove.

The selector 1316 outputs, in step 1416, one or more selected code units and their corresponding priorities to the constraint analysis subsystem 1332. In particular, referring to the example of FIGS. 15 through 17, since node 37 (FIG. 17) has the highest priority (i.e., a priority of 5) at least data indicative of node 37 (FIG. 17) is provided to the constraint analysis subsystem 1332 in step 1416.

The constraint analysis subsystem 1332 uses input of both the identification of the code units selected by the selector 1316, and the data representing the control/data flow graph generated by the priority estimation component 1308 (this later input shown by the arrow 1352 in FIG. 13). A high level description of the constraint analysis subsystem 1332 is provided hereinabove, and corresponds to the steps 1420 through 1436. However, for completeness these steps will be further described here. Accordingly, in step 1420, it is assumed that the identifier CU is assigned to the first code unit selected by the selector 1316. Note that the assignment here can be for convenience in describing the loops provided in the steps 1420 through 1432, and one of skill in the art will appreciate that there are additional techniques for iteratively sequencing through a plurality of code units provided by the selector 1316 (e.g., incrementing an array index, changing a pointer, etc.). Then in step 1424, a path $P_{CU}$ is determined through the control/data flow graph generated by the priority estimation component 1308, wherein the path $P_{CU}$ includes a node ($N_{CU}$) that identifies the code unit CU, and wherein the path $P_{CU}$ has not been previously considered in determining constraints corresponding to the code unit CU.

Subsequently, in step 1428, the following tasks are performed:

(a) For each node (N) on the path $P_{CU}$, the constraints deriver 1336 determines the constraints associated with the node N such that when these constraints are satisfied, then an execution of the software code 1310 (or its translated code) will continue to the next node on the path $P_{CU}$.

Note that the constraints deriver 1336 may use either a top-down or a bottom-up approach to derive constraints from the path $P_{CU}$. That is, the constraints deriver 1336 may start at either end of the path $P_{CU}$ when deriving the set of associated constraints. For example, if the path $P_{CU}$ through the control flow graph of FIG. 17 is the node sequence <0, 12, 27, 32, 37, and 50>, wherein CU is, e.g., the code line 27 of FIG. 16, then the bottom-up collection of constraints entails performing the following tasks (a.i) through (a.v):

(a.i) Starting from the last node (e.g., node 50), move backwards to node 37. The corresponding constraint for "iload %9; ifeq #50" is "x9==0".
(a.ii) Similarly, from node 37 to node 32, the constraint "x8==0" is obtained.
(a.iii) From node 32 to 27, the constraint "x7==0" is obtained.
(a.iv) From node 27 to 12, the constraint "x4!=0" is obtained.
(a.v) From node 12 to 0, the constraint "x1!=0" is obtained.

Thus, at the end of the constraint collection for the path $P_{CU}$, the set of constraints is as follows:
x1!=0; x4!=0; x7==0; x8==0; and x9==0.

(b) For each constraint identified in task (a) immediately above, reduce the constraint through substitutions so that the constraint is only in terms of the following: (i) basic data types (e.g., integer, real, character, string, Boolean, etc.); (ii) input parameters to the path $P_{CU}$; (iii) fields of input parameters to the path $P_{CU}$; and (iv) expressions using only (i) through (iii) above together with constants; and (iv) expressions using only (i) through (iii) together with constants.

For example, assume the following software code 1310 is input to the step 1404 and no translation is performed:

prog(x)
  int x;
  x:=x+1;
  if (x>0) then
    x:=x*x;
  else
    x:=0;
  print(x).

Figure 18:
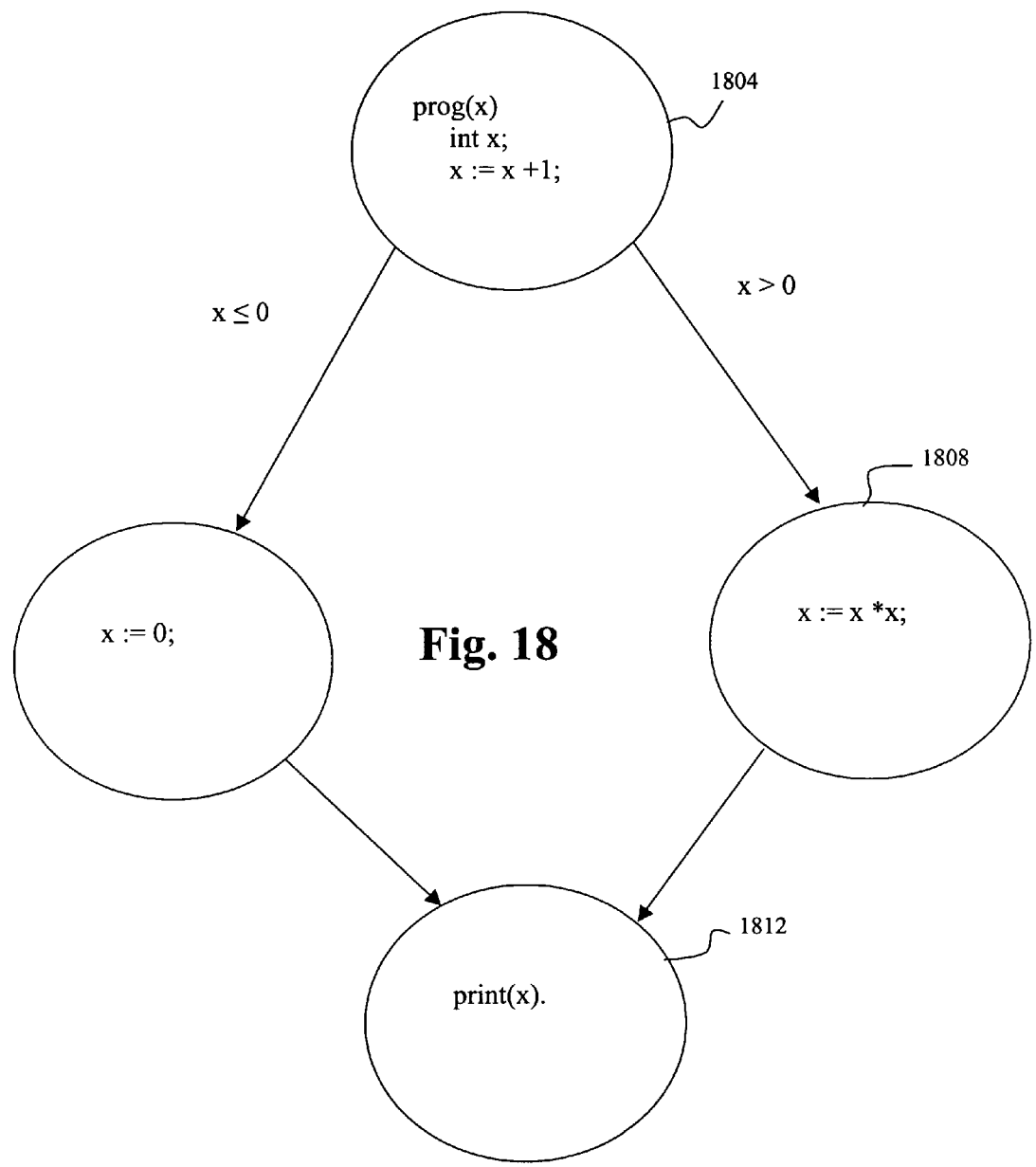
FIG. 18 shows a control flow graph for a simple C program disclosed in the Detailed Description section hereinbelow.

Further assume that the path $P_{CU}$ through the control flow graph corresponding to the above code "prog" is shown in FIG. 18 with the path $P_{CU}$ corresponding to the nodes 1804, 1808 and 1812 together with the directed edges therebetween. Then there is a single "constraint" (as this term is typically used) to be satisfied for ensuring that the path $P_{CU}$ is performed, i.e., x>0. However, the reduction of this constraint requires that "x" in the constraint be replaced by "x+1" so that the corresponding reduced constraint is in terms of the input parameter as required by (ii) immediately above. Thus, the resulting reduced constraint set is {x+1>0}. Accordingly, the term "constraint" as used in the description of the constraint analysis subsystem 1332 hereinabove, and in the description of the flowchart of FIG. 14 is more general in that assignments may be considered constraints when such assignments provide necessary information for reducing another constraint (C) along the path $P_{CU}$, wherein the constraint C identifies an edge of the path $P_{CU}$.

In performing constraint reductions, complex records/objects may need to be parsed so that if values are determined for their (basic data type) fields which make the path $P_{CU}$ feasible, then an appropriate instance of the complex record/object can be subsequently generated (in subsequent steps) for testing the software code 1310 (or the translation thereof).

(c) Add each reduced constraint to a list of constraints (referred to herein as CONSTRAINTS_LIST$_{CU}$).

Figure 21:
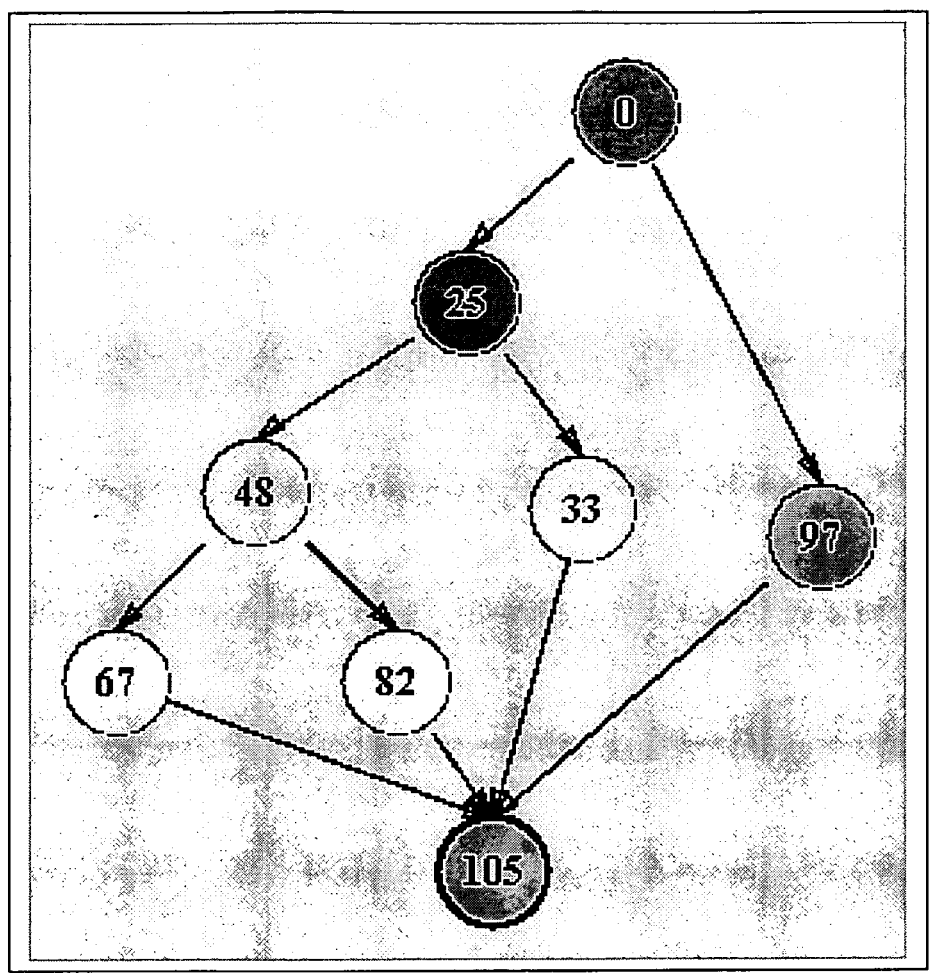
FIG. 21 shows a control flow graph for the bytecode of FIG. 20.

Before proceeding with additional description of the flowchart of FIG. 14, it worthwhile to provide a further example constraint derivation on a more complex software code input 1310; i.e., software code that includes a string comparison and an object function call. The Java code of FIG. 19 is illustrative of this more complex software code 1310, wherein FIG. 20 shows the corresponding bytecode that can be output by the translator 1312. To select a path for $P_{CU}$, a representation of the control flow graph corresponding to the bytecode of FIG. 20 must be generated. FIG. 21 shows such a control flow graph, wherein each node is labeled with the number of the corresponding code statement in FIG. 20 that starts the sequence of code statements identified by the node. Assuming the selected path for $P_{CU}$ includes the node sequence: <0, 25, 48, 82, 105>, the forward (i.e., top-down) constraint derivation for this example entails performing the following tasks (1) through (4):

1. From node 0 of FIG. 21, (i.e., code statements 0-22 of FIG. 20), the following assignment and a condition are identified as constraints:
   Sample.id==Sample.hashmap.get(aload_1)//i.e., The terms equal corresponds to statements 0-15 of FIG. 20 and
   Sample.id>0.//i.e., Corresponding to statements 19-22 of FIG. 20

2. From node 25 of FIG. 21, (corresponding to code statements 25 through 30 of FIG. 20), the following string comparison condition is identified as a constraint:
   "String.equals(aload_1, aload_2)".

3. From node 48 of FIG. 21; (i.e., statements 48 to 64 of FIG. 20), the following integer comparison condition is identified as a constraint:
   "length(aload_1)<=length(aload_2)".

4. Nodes 82 and 105 (FIG. 21) will then checked for constraints, but no constraints will be identified since there are none associated with these nodes.

Returning now to FIG. 14, in step 1432, a determination is made by the constraint solver 1340 as to whether the constraints on CONSTRAINTS_LIST$_{CU}$ are consistent, thus indicating whether or not the path P$_{CU}$ is feasible. If not, then step 1434 is performed for determining whether there is another path through the control/data flow graph that goes through a node, wherein the node identifies the code unit CU. If not, then step 1420 is again performed, wherein the next (if any) code unit selected by the selector 1332 is assigned to CU for again performing at least the steps 1424 through 1432. Note, however, if there is no further code units to be assigned to CU, then the flowchart of FIG. 14 is exited.

Alternatively, if the result from step 1434 indicates that there is an additional path through the control/data flow graph that goes through a node identifying the code unit CU, then step 1424 and steps following are performed.

In determining whether the constraints on CONSTRAINTS_LIST$_{CU}$ are consistent (equivalently, that path P$_{CU}$ is feasible), a novel evaluation method is used to decide whether constraints have conflicts (and accordingly not consistent). An example illustrates this novel constraint evaluation method. Assume that there are two constraints, "x>7" and "x<6." Two expressions are generated from these constraints. That is the first constraint ("x>7") is represented as x belongs to [7+e, MAX-X-TYPE], where e is the smallest positive number of variable x's data type, and MAX-X-TYPE is the maximum value of x's data type. For example, assuming that x is of integer data type, then e=1. MAX-X-TYPE can be determined similarly as the largest possible integer that is representable by an integer data type. Note that MAX-X-TYPE maybe computer dependent. Moreover, for some data types such as real, e may be computer dependent as well. Accordingly, in one embodiment, for data types such as integer and REAL, values for e and MAX-X-TYPE may be determined that are realizable in most computers, and additionally are respectively small enough and large enough so that a range such as [7+e, MAX-X-TYPE] will include substantially all the computer representable solutions regardless of the computer. Thus, regarding the expression [7+e, MAX-X-TYPE], the lower bound of the range is 8. So by replacing the variable x with this lower range, and the above original two constraints become "8>7" and "8<6", and the following expression "(8>7) && (8<6)" can generated and then evaluated. Similarly, MAX-X-TYPE will clearly be larger than 6. Thus, due to the linearity of the constraints, all possible evaluations are determined to be false, and thus it is concluded that the original constraints are not consistent.

For non-linear constraints, a value of each constraint variable can also be determined by determining lower and upper bounds in a manner similar to that described immediately above. For example, suppose for a given path P (of the appropriate control/data flow graph), there are exactly the two constraints "$X^2>9$" and "$X<3$" for determining feasibility of the path. The first constraint yields two segments, [3+e, MAX-X-TYPE] and [MIN-X-TYPE, -3-e]. Since both "X=MIN-X-TYPE" and "X=-3-e" satisfy the two constraints, "$X^2>9$" and "$X<3$", it can be concluded that the path P is feasible.

For some collections of constraints, various types of searches may be used for identifying whether the constraints are consistent. In particular, a binary search may be used. For example, suppose for a given path P (of the appropriate control/data flow graph), there are exactly the three constraints "$X^2>9$" and "$X<-9$" and "$X>-4$" for determining feasibility of the path. Starting with the variable range of [MIN-X-TYPE, -3-e] corresponding to the first constraint, the boundary checking fails (i.e., MIN-X-TYPE <-4, and, -3-e>-9). Accordingly, the range [MIN-X-TYPE, -3-e] is decomposed into [MIN-X-TYPE, (MIN_X_TYPE-3-e)/2] and [(MIN_X_TYPE-3-e)/2, -3-e], and the end points of these ranges are tested for consistency. It turns out that [MIN-X-TYPE, (MIN_X_TYPE-3-e)/2] is a feasible solution.

The following substeps of step 1432 may be used for determining the feasibility of a given path P after all constraints for the path P have been reduced:

(a) Find all the constraints $C_k$ inside CONSTRAINTS_LIST$_{CU}$ that involve only one single identifier, put them in a set C; thus assume C={$C_1, C_2, C_n$}.

(b) For each constraint $C_k$ in the set C, find its corresponding identifier (denoted herein as Vc$_k$).

(c) For each constraint $C_k$ in the set C, determine a range for the corresponding identifier Vc$_k$ in the manner of the examples above. Accordingly, from this substep, a set of ranges R={R(Vc$_1$), R(Vc$_2$), R(Vc$_n$)} is obtained, wherein R(Vc$_k$) is a range for the identifier Vc$_k$. Note that these first three substeps (a)-(c) deal with constraints with only one identifier. The next substep deals with constraints with two identifiers each on one side of an "equality" comparison.

(d) Find all simple "equality" comparison constraints q with only one variable on each side of the equation, such as $V_i==V_j$ and $V_i==V_k$, and put them in a set E={$e_1, e_2, \ldots, e_x$}, where each $e_k$ has a "left" subfield identifying the variable on the left of the corresponding equality comparison, and $e_k$ has a "right" subfield identifying the variable on the right of the corresponding equality comparison. For example, "$e_1$.left" is the identifier on the left side of the equality comparison for $e_1$, and "$e_1$ sight" is the identifier on the right side of the equality comparison for $e_1$. Perform the following program using E as input together with a new empty set F as input. Note that in the program, "==" a test for equality of identifier names. The output is a new set of equality pairs given in F. This program finds and replaces identical identifiers.

```
equality-replace(in: E, out: F)
{
    While not-empty(E) do {
        e_1 = first-element(E); // get first element of the set E
        removeFromOneSetAndAddToTheOther(e_1, E, F); // remove
            e_1 from E and add it to F
        for (int i=1; i <= length(E); i++) {
            if ((e_i.left = =e_1.left) || (e_i.left = = e_1.right)) {
                e_i.left = e_i.right;
```

-continued

```
        e_i.right = e_1 .right;
        removeFromOneSetAndAddToTheOther(e_i, E, F);
        continue;
      }
      if ((e_i.right = = e_1.left) || (e_i.right == e_1.right)) {
        e_i.right = e_1.right;
        removeFromOneSetAndAddToTheOther(e_i, E, F);
      }
    }
  }
}
```

(e) For all elements in the set $F=\{e_1, \ldots, e_y\}$ generated from the previous program of substep (d) and all elements in R generated from substep (c), replace the identifiers $Vc_k$ in elements of R with the right side identifiers of equality expressions in F. For example, suppose $e_1$.left is the same identifier as $Vc_1$, then replace $Vc_1$ with $e_1$.sight. Accordingly, a new set of $R=\{R(Vc_1), R(Vc_2), \ldots, R(Vc_n)\}$ is obtained. At this point, all identifiers in elements of R that were also in an equality expression of F have been replaced with one unique identifier.

(f) Determine a new range for each variable $Vc_1, Vc_2, \ldots, Vc_n$. If some of these identifiers are the same identifier, find the intersection of their ranges. If any such intersection is empty, then no feasible value can be found for the identifier. Accordingly, the constraints are determined to be infeasible and the determination as to whether the present path P is feasible terminates. For example, if $Vc_i$ is the same identifier as $Vc_i$, the intersection of $Vc_i$'s range $R(Vc_i)$ and $Vc_j$'s range $R(Vc_j)$ is the range for the identifier $Vc_i$, and the identifier $Vc_j$ can be removed. If the intersection range is empty, an infeasibility is detected for this set of constraints. If the intersection range is non-empty, and there are more sets of constraints corresponding to the path P, then perform substep (h) next for obtaining (if possible) a new set of constraints C, and repeat this process starting from substep (b). Note that the infeasibility check performed in this substep deals only with cases where the constraints are relatively simple in that these constraints have only one identifier, or two identifiers within a "==" constraint. Note that more complex constraints may be solved by currently available best-effort constraint solvers. However, such constraint solver can have a very high computational overhead even in solving the constraints (or determining the infeasibility of such constraints) for paths having only simple constraints thereon, as one skilled in the art will understand. Thus, the present substep preferably determines infeasibility of paths having relatively simple constraints as a way of filtering out such simple infeasible paths so that the overhead of activating such best-effort constraint solvers (e.g., as is performed in the step 1436) on such simple cases is prevented.

(g) After the above intersection operation of substep (f), $Vc_1, Vc_2, \ldots, Vc_{new}$ are all different identifiers. For each of these identifiers, find their range boundaries. Since each range can include multiple segments, the number of boundary values can be more than 2; i.e., the boundary values are the beginning and the ending values of a continuous range of values for one of the identifiers.

(h) Use the boundary values to replace the identifiers in the rest of constraints in the current set C that involve more than one of the identifiers and obtain (if possible) a new set of constraints. If no additional constraint set is generated for evaluation, the path is determined to be infeasible and this process ends. However, if a new set of constraint is determined, then repeat this process by starting at substep (b).

At the end of this feasibility check, some infeasible paths may escape the detection. Accordingly, further detection of infeasible paths is determined in step 1436 described hereinbelow.

In addition to checking the feasibility of various paths through the software code 1310 or translation thereof (equivalently, the corresponding control/data flow graph), redundant constraints can also be removed. For example, as identified above, the following four constraints are obtained from the bytecode of FIG. 20 corresponding to the Java program displayed in FIG. 19.

(1) Sample.id==Sample.hashmap.get(aload__1)
(2) Sample.id>0
(3) String.equals(aload__1, aload__2)
(4) length(aload__1)<=length(aload__2)

Note that constraint (3) immediately above implies that "length(aload__1)==length(aload__2)," which is a subset of constraint (4) immediately above. Therefore constraint (4) is redundant and can be removed from the constraint list. Also, constraints (1) and (2) can be combined as "Sample.hashmap.get(aload__1)>0." Thus, the following steps may be used for removing redundant constraints in a constraint list associated with a path through a control/data flow graph:

(i) For an identifier in an assignment or equality comparison, if the identifier also occurs in an additional constraint, then the identifier can be replaced in the additional constraint. For example, in item (2) immediately hereinabove, "Sample.id" can be replaced with "Sample.hashmap.get(aload__1)" from item (1) immediately above.

(ii) For a given constraint $C_j$, remove each constraint $C_m$, wherein if $C_j$ is satisfied, then $C_m$ is also satisfied. For example, if records (or objects) X and Y are compared (i.e., X==Y), then for some function (or method) F, an additional comparison such as F(X)==F(Y) or F(X)>=F(Y), or a sub-field comparison such as X.fld_a==Y.fld_a is redundant, and accordingly the additional comparison can be safely removed.

Referring to the code of FIGS. 19 and 20, the result from removing redundant constraints results in only two constraints remaining for the bytecode of FIG. 20:

(1) Sample.hashmap.get(aload__1)>0, and
(2) String.equals(aload__1, aload__2).

Referring again to step 1434, if the path $P_{CU}$ is determined to be feasible, then step 1436 is performed, wherein the constraints on CONSTIRAINTS_LIST$_{CU}$ are solved via the constraint solver 1340. If the constraint solver 1340 finds the set of constraints are not solvable, then a new path is found to generate test data. If all constraints sets of all paths are not solvable, no test data can be generated automatically and operator intervention is necessary. Otherwise, note that for each identifier instanced in one of the constraints, there is at least one collection of ranges for these identifiers such that a selection of a value from the corresponding range for each identifier will cause the path $P_{CU}$ to be traversed. Thus, obtaining one or more sets of values for identifiers satisfying these ranges may be performed by various techniques such as linear programming, and/or binary search as one skilled in the art will understand. Accordingly, in one embodiment, random values within the corresponding ranges for each of the identifiers may be selected to obtain such a set of values for generating test code. Thus, one or more such sets may be generated in this manner. However, alternative techniques for obtaining such values are also within the scope of the present disclosure, including (a) providing range information to a user so that the user can select a variable value, and (b) using past experience and/or heuristics to find such a value. For example, a heuristic or rule may used that specifies that a value for such a variable is be selected within a range of 5 to 15 67% for 67% of the test cases. Using this field usage criterion, a value of 10 is selected Subsequently in step 1440, for each of the one or more sets of identifier values determined in step 1436, corresponding test data is generated for one or more users to write test code for creating an appropriate computational environment within which the software code 1312 (or a translation thereof) can be executed. Thus, the generated test data will allow users to construct code for creating particular objects or records that are required to properly test the software code 1310 (or a translation thereof) along the path $P_{CU}$. Note that the generation of the test code may be accomplished manually.

Subsequently in step 1444, the test code written by user(s) based on generate test data is used to execute the software code 1310 (or a translation thereof) for determining whether the code being tested malfunctions, and for determining the actual extent of the coverage of the code being tested that the test code provides.

Finally in step 1448, code coverage priorities are updated to reflect that a portion of the code being tested has been covered. In particular, since step 1448 may be iteratively performed when testing the software code 1312 (or a translation thereof), once a code unit (or corresponding flow/control graph node) is covered, its priority is set to zero, and the priorities of code units (or corresponding flow/control graph nodes) are recalculated, and the results are then provided to the selector 1316 (as in step 1412) for determining additional code units to be covered. Subsequently, step 1416 and steps following are again performed until there are no further code units to be covered.

A number of variations and modifications of the invention can be used. It would be possible to provide for some features of the invention without providing others.

For example, dedicated hardware implementations including, but not limited to, Application Specific Integrated Circuits or ASICs, programmable logic arrays, and other hardware devices can likewise be constructed to implement the methods described herein.

Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for determining a series (S) of one or more code units within program code, comprising:

first determining, by a processor, a plurality of series of code units, wherein for each series of code units, if any one of the code units of the series is executed, then each code unit of the series is executed;

identifying, by the processor, at least one series (So) of the plurality of series of code units, wherein So includes an invocable program block, the invocable program block comprising a set of one or more invocable program elements, wherein the invocable program block has at least one statement that invokes at least one invocable program element, wherein the invocable program element includes one or more members of a group consisting of a function call, a method call, a program call, another invocable program element, and combinations thereof;

second determining, by the processor, a grouping of one or more code units for each of the invocable program elements in the set, wherein the grouping includes at least some of the code units for at least one execution path from a starting code unit for the respective invocable program element to an ending code unit for the respective invocable program element;

executing, by the processor, a relaxed priority estimation, wherein the relaxed priority estimation determines a priority value as a number of code lines that at least will be executed without determining which specific code line will be executed;

based on the relaxed priority estimation, third determining, by the processor, a value for at least one of: the invocable program block and each of the invocation program blocks in the set; and determining, by the processor, the series S as one of the plurality of series, wherein S is related to the value.

2. The method of claim 1, wherein the value of an invocable program element is related to a number of members in the corresponding grouping and wherein determining the series S as one of the plurality of series, wherein S is related to the value comprises:

obtaining a priority for each series of the plurality of series, wherein the priority for So is dependent upon the value for at least one member of the set; and wherein S is determined from the priorities.

3. The method of claim 1, wherein the value for the invocable program element is related to a number of code units executed in a path through the invocable program element.

4. The method of claim 1, wherein the grouping includes substantially all code units for at least one execution path from a starting code unit for the invocable program element to an ending code unit for the invocable program.

5. The method of claim 1, wherein the value is dependent upon one or more additional invocable program elements invoked when the code units of the path are executed.

6. The method of claim 2, wherein the plurality of series comprises a plurality of invocation blocks and wherein third determining a value for at least one of: the invocable program block and each of the invocation program blocks in the comprises the following set of steps performed for each of the invocation blocks and for each of the invocation program elements in the corresponding set:

determine an entry value for an entry code unit; and add to the entry value a node value corresponding to a super block node identifying the entry code unit, wherein the priority is the sum of the entry and node values.

7. The method of claim 1, wherein the value is derived from at least one of: (i) a number of lines of source code associated with a corresponding node in a super dominator graph, (ii) the number of object code statements associated with the identified node, and (iii) a number of basic data type fields whose value can change during execution of the code identified by the node.

8. The method of claim 1, wherein second determining a grouping of one or more code units for each of the invocable program elements in the set comprises the substeps of:

obtaining a representation of a graph, wherein the graph corresponds to a flow graph for the program code, and each node of the graph corresponds to a series of code units of the program code, wherein at least some of the nodes correspond to at least one of an invocation program block and element, and wherein if any one of the code units of the series is executed, then each code unit of the series is executed; and determining one or more acyclic executable paths through the graph from a predetermined starting node of the graph to a predetermined ending node of the graph; and wherein based on the relaxed priority estimation, third determining a value for eat one of: the invocable program block and each of the invocation program blocks in the set comprises the substeps:

determining, for each of at least some nodes of the graph, a corresponding value, wherein for each node having a corresponding value, the corresponding value is indicative of a number of code units executed when the corresponding series for the node is executed;

determining, for each of the acyclic executable paths, a corresponding path weight, wherein for each executable path (P) having a path weight (Wtp), the path weight Wtp is related to a combination of the values of the nodes of the executable path P; and sorting the executable paths according to their corresponding path weights; and wherein determining the series S as one of the plurality of series, wherein S is related to the value comprises the substeps:

determining, for each node (N) of the graph, a corresponding priority using the path weight for each of the executable paths containing N; and determining the series S of code units from the corresponding priorities of the nodes.

9. The method of claim 1, wherein second determining a grouping of one or more code units for each of the invocable program elements in the set comprises the substeps:

identifying a path through the program code, the path corresponding to a plurality of sets of code units;

determining constraints in the sets of code units that, if satisfied, cause the path to be executed; and solving the constraints for determining input data to the program code.

10. The method of claim 1, further comprising:

determining constraints in the code units that, if satisfied, cause the program code to be executed;

determining, for at least one composite data type having an instantiation accessed by the constraints, a range of values for each of at least two non-composite data fields of the instantiation; and solving the constraints for determining input data to the program code, wherein the range for at least one of the non-composite data fields is used for solving the constraints.

11. The method of claim 1, further comprising:

compiling the program code into a corresponding second program code having a reduced number data operator types than is used in the original program code, and once compiled, the following steps are performed:

determining constraints in the code units of the second program code that, if satisfied, cause the program code to be executed; and solving the constraints for determining input data to the program code.

12. A non-transitory computer readable medium, stored on a tangible medium, comprising processor executable instructions to perform the steps of claim 1.

13. A system that determines a series (S) of one or more code units within program code, comprising:

a processor operable to execute;

a priority estimation component operable to:

determine a plurality of series of code units, wherein for each series of code units, if any one of the code units of the series is executed, then each code unit of the series is executed;

identify at least one series (So) of the plurality of series, wherein So includes an invocable program block, the invocable program block comprising a set of at least one invocable program elements;

determine a grouping of one or more code units for each of the invocable program elements in the set, wherein the grouping includes at least some of the code units for at least one execution path from a starting code unit for the respective invocable program element to an ending code unit for the respective invocable program element, wherein the invocable program element proceeds from a predetermined entry code unit to at least one predetermined exit code unit, and wherein the invocable program element is at least one of a group consisting of a software package, a collection of one or more of class hierarchies, class methods, functions, subprograms, macros, other executable structures that are invoked, and combinations thereof;

executing a relaxed priority estimation, wherein the relaxed priority estimation determines a priority value as a number of code lines that at least will be executed without determining which specific code line will be executed;

based on the relaxed priority estimation, determine a value for at least one of: the invocable program block and the at least one invocation program elements; and determine the series S as one of the plurality of series, wherein S is related to the value.

14. The system of claim 13, wherein the value of an invocable program element is related to a number of members in the corresponding grouping and wherein the priority estimation component obtains a priority for each series of the plurality of series, wherein the priority for So is dependent upon the value for at least one member of the set and wherein S is determined from the priorities.

15. The system of claim 13, wherein the value for the invocable program element is related to a number of code units executed in a path through the invocable program element.

16. The system of claim 13, wherein the grouping includes substantially all code units for at least one execution path from a starting code unit for the invocable program element to an ending code unit for the invocable program.

17. The system of claim 13, wherein the value is dependent upon one or more additional invocable program elements invoked when the code units of the path are executed.

18. The system of claim 14, wherein the plurality of series comprises a plurality of invocation blocks and wherein determine a value for at least one of: the invocable program block and the at least one invocation program elements comprises the following set of sub-operations performed for each of the invocation blocks and for each of the invocation program elements in the corresponding set:

determine an entry value for an entry code unit; and add to the entry value a node value corresponding to a super block node identifying the entry code unit, wherein the priority is the sum of the entry and node values.

19. The system of claim 13, wherein the value is derived from at least one of:

(i) a number of lines of source code associated with a corresponding node in a super dominator graph, (ii) the number of object code statements associated with the identified node, and (iii) a number of basic data type fields whose value can change during execution of the code identified by the node.

20. The system of claim 13, wherein determine a grouping of one or more code units for each of the invocable program elements in the set comprises the sub-operations of:

obtaining a representation of a graph, wherein the graph corresponds to a flow graph for the program code, and each node of the graph corresponds to a series of code units of the program code, wherein at least some of the nodes correspond to at least one of an invocation program block and element, and wherein if any one of the code units of the series is executed, then each code unit of the series is executed; and determining one or more acyclic executable paths through the graph from a predetermined starting node of the graph to a predetermined ending node of the graph; and wherein based on the relaxed priority estimation, third determining a value for eat one of: the invocable program block and each of the invocation program blocks in the set comprises the substeps:

determining, for each of at least some nodes of the graph, a corresponding value, wherein for each node having a corresponding value, the corresponding value is indicative of a number of code units executed when the corresponding series for the node is executed;

determining, for each of the acyclic executable paths, a corresponding path weight, wherein for each executable path (P) having a path weight (Wtp), the path weight Wtp is related to a combination of the values of the nodes of the executable path P; and sorting the executable paths according to their corresponding path weights; and wherein determining the series S as one of the plurality of series, wherein S is related to the value comprises the substeps:

determining, for each node (N) of the graph, a corresponding priority using the path weight for each of the executable paths containing N; and determining the series S of code units from the corresponding priorities of the nodes.

21. The system of claim 13, further comprising:

a constraint analysis subsystem operable to:

identify a path through the program code, the path comprising a number of sets of code units;

determine constraints in the sets of code units that, if satisfied, cause the path to be executed; and solve the constraints for determining input data to the program code.

22. The system of claim 13, further comprising:

a constraint analysis subsystem operable to:

determine constraints in the code units that, if satisfied, cause the program code to be executed;

determine, for at least one composite data type having an instantiation accessed by the constraints, a range of values for each of at least two non-composite data fields of the instantiation; and solve the constraints for determining input data to the program code, wherein the range for at least one of the non-composite data fields is used for solving the constraints.

23. The system of claim 13, further comprising: a code translator operable to translate the program code into a corresponding second program code having a reduced number data operator types than is used in the original program code, and a constraint analysis subsystem operable, once the program code is translated, to:

determine constraints in the code units of the second program code that, if satisfied, cause the program code to be executed; and solve the constraints for determining input data to the program code.

* * * * *

UNITED STATES PATENT AND TRADEMARK OFFICE
CERTIFICATE OF CORRECTION

| | | |
|---|---|---|
| PATENT NO. | : 7,886,272 B1 | |
| APPLICATION NO. | : 11/477020 | |
| DATED | : February 8, 2011 | |
| INVENTOR(S) | : Dennis C. Episkopos et al. | |

It is certified that error appears in the above-identified patent and that said Letters Patent is hereby corrected as shown below:

At column 35, line 42, after "blocks in the" insert --set--.

At column 36, line 5, "eat" should be changed to --each--.

At column 38, line 13, "eat" should be changed to --each--.

Signed and Sealed this
Nineteenth Day of April, 2011

David J. Kappos
*Director of the United States Patent and Trademark Office*